US012589638B2

(12) United States Patent　　(10) Patent No.:　US 12,589,638 B2
　　Esnault　　　　　　　　　　　　　(45) Date of Patent:　　Mar. 31, 2026

(54) MOTOR VEHICLE BODY PROVIDED WITH AN OPENING RECEIVING AN OPENING LEAF ARTICULATED BETWEEN A CLOSED LOW POSITION AND AN OPEN HIGH POSITION

(71) Applicant: Paul Esnault, Montardon (FR)

(72) Inventor: Paul Esnault, Montardon (FR)

( * ) Notice: Subject to any disclaimer, the term of this patent is extended or adjusted under 35 U.S.C. 154(b) by 12 days.

(21) Appl. No.: 18/719,853

(22) PCT Filed: Dec. 9, 2022

(86) PCT No.: PCT/FR2022/052298
　　§ 371 (c)(1),
　　(2) Date: Nov. 8, 2024

(87) PCT Pub. No.: WO2023/111428
　　PCT Pub. Date: Jun. 22, 2023

(65) Prior Publication Data
　　US 2025/0058609 A1　　Feb. 20, 2025

(30) Foreign Application Priority Data
　Dec. 16, 2021　(FR) ...................................... 2113648

(51) Int. Cl.
　　*B60J 5/06*　　　(2006.01)
　　*E05D 15/58*　　(2006.01)
　　*E05F 15/67*　　(2015.01)
(52) U.S. Cl.
　　CPC .............. *B60J 5/06* (2013.01); *E05D 15/582*
　　　　(2013.01); *E05F 15/67* (2015.01); *E05Y*
　　　*2900/531* (2013.01); *E05Y 2900/55* (2013.01)

(58) Field of Classification Search
　　CPC .................................................... E05D 15/582
　　See application file for complete search history.

(56) References Cited

U.S. PATENT DOCUMENTS 3,093,405 A　*　6/1963　Barenyi ..................... B60J 5/06
　　　　　　　　　　　　　　　　　　　49/212
3,169,282 A　*　2/1965　Godwin ................ B64C 1/1407
　　　　　　　　　　　　　　　　　　　49/70
(Continued)

FOREIGN PATENT DOCUMENTS

CN　　　110700717 A　　　1/2020
DE　　102016202395 B3　*　7/2017　............. B60J 5/047
(Continued)

*Primary Examiner* — Catherine A Kelly
(74) *Attorney, Agent, or Firm* — H&I PARTNERS; Chai Im; C. Andrew Im

(57)　　　　　　　ABSTRACT

A body of a motor vehicle having a supporting structure extending between a front end and a rear end, a floor, a roof and at least one lateral flank. The lateral flank is provided with an opening defined by an embrasure and receiving a single opening leaf articulated between at least a first closed low position which occults the opening and a second open high position. The second open position is spaced apart from the opening and is positioned at least partially above the roof. The supporting structure includes a post passing vertically through the opening. A single vertical transport carriage is mounted mobile in translation from top to bottom and from bottom to top along the post to pass the opening leaf from the first closed low position to the second open high position, and vice versa.

24 Claims, 19 Drawing Sheets

(56)          References Cited

U.S. PATENT DOCUMENTS

| | | | | | |
|---|---|---|---|---|---|
| 4,702,514 | A | * | 10/1987 | Perry | E05D 15/582 |
| | | | | | 49/212 |
| 5,013,082 | A | * | 5/1991 | Landmesser | B60J 5/0473 |
| | | | | | 296/202 |
| 5,992,918 | A | * | 11/1999 | Gobart | B60J 5/0473 |
| | | | | | 296/146.13 |
| 6,260,907 | B1 | * | 7/2001 | Liu | B60J 5/062 |
| | | | | | 296/186.4 |
| 7,048,029 | B2 | * | 5/2006 | Rieder | E05F 15/676 |
| | | | | | 49/358 |
| 7,503,618 | B2 | * | 3/2009 | Geyrhofer | E05D 15/00 |
| | | | | | 49/226 |
| 10,227,810 | B2 | * | 3/2019 | Linden | E05B 81/14 |
| 2023/0265705 | A1 | * | 8/2023 | Eliasson | E05F 15/684 |
| | | | | | 49/199 |

FOREIGN PATENT DOCUMENTS

| | | | | | |
|---|---|---|---|---|---|
| DE | 102018202386 | A1 * | 8/2019 | | E05F 15/686 |
| DE | 102018206227 | A1 * | 10/2019 | | B60J 5/047 |
| DE | 102018211963 | A1 * | 1/2020 | | B60J 5/047 |
| DE | 102020112528 | A1 * | 11/2021 | | B60J 7/04 |
| KR | 101867943 | B1 * | 6/2018 | | F16H 19/04 |
| WO | 03045723 | A1 | 6/2003 | | |
| WO | 2018100295 | A1 | 6/2018 | | |

* cited by examiner

MOTOR VEHICLE BODY PROVIDED WITH AN OPENING RECEIVING AN OPENING LEAF ARTICULATED BETWEEN A CLOSED LOW POSITION AND AN OPEN HIGH POSITION

RELATED APPLICATIONS

This application is a § 371 application of PCT/FR2022/052298 filed Dec. 9, 2022, which claims priority from French Patent Application No. 2113648 filed Dec. 16, 2021, each of which is incorporated herein by reference in its entirety.

TECHNICAL FIELD OF THE INVENTION

The present invention relates to a motor vehicle body and in particular a sedan, a coupé or a SUV, including at least one side flank provided with an opening defined by an embrasure and receiving a door-type opening leaf.

BACKGROUND OF THE INVENTION

In the automotive industry, there are several types of opening leaves enabling a user to get in or get out of his/her vehicle. These different types of doors are characterized by their drive kinematics enabling them to move between an open position, in which a user accesses the passenger compartment of the vehicle, and a closed position, in which the door prevents access to the passenger compartment of the vehicle.

Thus, in general, there are several families of opening leaves, namely:

the "door leaf" or "French-fashioned" opening leaves which are most commonly used in the automotive industry, one side of these opening leaves pivoting about a substantially vertical axis (usually including several mechanical hinges) between a closed position sealing the opening and an open position overhanging laterally from the body; the main drawbacks that one could notice for this type of doors is that they overhang by several tens centimeters (about 50 cm to 100 cm) with respect to the flank of the vehicle, which might cause difficulties in opening the door and coming out of the vehicle if a wall or another vehicle is placed too close, difficulties in opening the door to get in the vehicle because of an insufficient side space (for the same reasons as those mentioned before), risks of damaging the flange of the door against a wall or a post, or of damaging the body of the adjacent vehicle, and above all very high risks in terms of road safety since the sudden opening of the door by the driver or a passenger could create an unexpectable obstacle for another vehicle (truck, bus, car) coming from behind and for an individual riding a bicycle or a motorbike/small motorbike/scooter (risk of a more or less violent, and even fatal, impact especially in agglomerations), and that being so in spite of the different road safety campaigns dealing with the subject;

the "sliding" type doors which move in a substantially vertical plane between a closed position and an open position; their main drawback is that the panels of these doors are most often suited to cargo-type utility vehicles or to "monospace" type vehicles, and are therefore difficult to install on a sedan or a coupé (in particular because of the curvature of the flanks between the floor and the roof). Moreover, the kinematics of these doors are complex, fragile (external rail), and sometimes difficult to handle by hand. Finally, the aesthetic appearance of these doors remains somehow low;

the "elytra" type opening leaves which pivot about a transverse horizontal axis more or less perpendicular to the plane of the opening leaves between a closed position and an open position raised upwards (the rear of the door generally forming the highest point thereof); this door type is perfectly suitable for high-end sports cars (McLaren® models F1 or P1, Ferrari® model La Ferrari®, Lamborghini® models Countach® or Diablo®, Koenigsegg® model Regera®) which have only two long doors and which are usually extremely low; and the vertical lift-type doors, commonly so-called "butterfly doors", composed of a structural panel which pivots about a substantially horizontal axis located at the top of the embrasure of the opening between a closed position and one open position deployed above the roof of the vehicle, which is found on the DeLorean® model DMC-12®, the Mercedes® model SLS AMG® or the Tesla® model X®; these systems are particularly complex to manufacture and require substantial modifications of the structure of the body and in particular of the roof (cut-out, addition of reinforcements conferring the mechanical strength necessary to withstand the stresses generated by the weight of the door and by the forces to which the chassis is subjected when the motor vehicle is moving, kinematics), which are completely incompatible with many options such as sunroof, roof rack, panoramic roof or roof bars. The result of these arrangements is a non-negligible overweight for vehicles provided with vertical lift-type doors in comparison with vehicles comprising doors of other types, as well as a substantial extra cost. Another drawback lies in the lengthening of the manufacture time of a vehicle comprising vertical lift-type doors because of the particular arrangements that should be provided for in the chassis of the vehicle. Furthermore, the vertical lift-type doors of the prior art have safety problems in the event of a lateral impact, i.e. according to an axis more or less perpendicular to the direction of advance of the vehicle. The vertical bulk of these doors once raised, even on very low sports models, remain extremely large so that the use of these doors in most personal or underground parking lots is delicate, and even impossible. Hence, this door type is most often reserved for prestige vehicles made in small series for an off-standard customer in terms of purchasing power.

In the automotive industry, the concept of a double door (i.e. giving access to the front and rear seats on the same side of the vehicle) already exists with the concept of the butterfly type double door. This solution is elegant and fills well its double door function, but it is not without overhang and always requires a ceiling height greater than 2.30 meters, which makes it unusable in urban parking spaces. This double butterfly door concept is often shown in automotive fairs on concept car/show car that will never be manufactured by a manufacturer who is industrializing for a mass market. This door type is too expensive to manufacture because it requires a specific platform construction like for a cabriolet. In addition, it poses a safety problem in the event of a lateral impact because, in general, the central post is eliminated. Hence, this concept is reserved for the "supercars", with special front seats capable of assuming anchorage and shock under kinetic energy of a seat belt provided for the front seats.

Thus, each of these types of opening leaves has advantages, in particular an original design and an aesthetically-attractive maneuver kinematics for "butterfly" and "elytra" type opening leaves, but also very numerous drawbacks.

OBJECT AND SUMMARY OF THE INVENTION

The invention aims to design a new type of opening leaf which, in particular, combines simplicity of use and reduced bulk during the maneuvering phases, while providing a new esthetic dimension and a substantially enhanced safety.

To this end, according to a first aspect, the present invention relates to a motor vehicle body including a supporting structure/chassis extending between a front end and a rear end and having a floor, a roof, and at least one side flank extending at least partly between said two ends, the floor and the roof, said side flank being provided with an opening defined by an embrasure and receiving one single opening leaf, such as a door, articulated between at least a first closed extremely low position in which said opening leaf occults said opening and a second open extremely high position in which said opening leaf is away from said opening and is positioned at least partly above the roof, characterized in that the supporting structure includes a post passing vertically through said opening and one single transport carriage is mounted movable in translation from top to bottom and from bottom to top along said post to make said opening leaf switch from the first closed extremely low position into the second open extremely high position, and vice versa.

In particular, this completely innovative solution and kinematics allow opening a vehicle door with extremely little space between the latter and an obstacle such as a wall or another vehicle. It makes the opening of the door simple, rapid, extremely safe (no risk of collision with cyclists or motorcyclists).

The invention is implemented according to the embodiments and the variants set out hereinafter, which should be considered individually or according to any technically feasible combination.

Advantageously, the opening leaf having a convex outer profile matching the side flank of said supporting structure in the first closed extremely low position, the distance "d" between said outer profile and the side flank is permanently less than a few centimeters (typically less than 10 cm and even less depending on the curvature of the door and of the body) throughout the passage of said opening leaf from the first closed extremely low position into the second open extremely high position, so that said opening leaf is of the vertical opening type without side overhang.

This so-called "lateral overhang free" solution allows considerably reducing the lateral bulk of the vehicle in all positions, and especially during opening/closure of the doors. Thus, besides the safety aspect related to the implemented kinematics type, it is possible to provide a sedan, coupé, SUV or monospace type vehicle with doors having a large longitudinal, and possibly vertical, dimension, without laterally overhanging from the body (at the level of the roof but also at the rocker panel), or over a dimension not exceeding a few centimeters. As a reminder, doors with French-fashioned opening can overhang laterally from the vehicle body by more than 50 to 80 cm depending on their dimensions, their installation (positioning of the hinge), the opening type and the opening angle.

Preferably, the opening leaf has a lower portion mounted on a longitudinal rotation shaft secured to the vertical transport carriage so that said opening leaf can take on an outwardly tilted intermediate position in which an upper portion of the latter deviates laterally from the opening and from the flank, before said opening leaf moves vertically from said tilted intermediate position towards the second open extremely high position.

With this solution, the door performs a first rotational movement to separate its upper portion from the top of the embrasure of the opening in order to enable the subsequent rise thereof according to the kinematics provided to this end by means of the vertical transport carriage.

More specifically, the pivot angle ($\alpha$) of the opening leaf between the first closed extremely low position and the tilted intermediate position is smaller than 20°, preferably comprised between about 10° and about 15°.

According to a particularly interesting aspect of the present invention, the longitudinal rotation shaft is connected to a first electric motor equipped with a gear motor for tilting the opening leaf.

According to a preferred embodiment of the present invention, the opening leaf has a movable window and a second electric motor equipped with a gear motor to lower the latter before moving the opening leaf from the first closed extremely low position to the second open extremely high position, and to raise it once said opening leaf is back in the first closed extremely low position.

In particular, this solution allows protecting the window during the vertical movements of the door.

According to a complementary aspect, the vertical transport carriage is equipped with at least one third electric motor equipped with a gear motor for moving the opening leaf along the vertical post.

According to one variant, the vertical transport carriage is equipped with two electric motors arranged on either side of the central post and connected to a common gear motor.

Preferably, all of the motors are combined in one single common motor carried by the vertical transport carriage, which simplifies the wirings, the electric power supply and the operation. Of course, the motor will be sized accordingly and will comprise several integrated systems of planetary and/or rack gear motors.

According to another alternative, the first tilt motor is integrated with the vertical transport carriage.

Similarly, the second window motor is integrated with the opening leaf.

According to a particular embodiment of the present invention, the opening leaf includes a secondary battery and electrical connectors and the vertical post includes electrical connection pads cooperating with said connectors to connect the secondary battery to a main battery of the body only in the first closed extremely low position of the opening leaf in order to recharge said secondary battery.

Thus, the electrical connections used to operate the motors ensuring the different movements are extremely simple, effective and reliable.

According to another particularly interesting aspect of the present invention, the opening leaf is equipped with at least one hook adapted to grip at an upper portion of the embrasure when the opening leaf is in the second open extremely high position in order to hold the latter in this position.

Thus, the door is held firmly in the high position once it has been raised, which allows avoiding it moving and damaging the carriage or the vertical post for example because of a strong wind or a deliberate action of an ill-intentioned person, which would attempt to move the door laterally by shaking its front or rear portion laterally or from the top downwards.

Preferably, the opening leaf has a first hook at the low front portion and a second hook at the low rear portion, each of these hooks engaging in a flange provided in the embrasure of the opening to immobilize said opening leaf in the second open extremely high position, said hooks fitting freely inside respective openings provided to this end in a lower portion of the embrasure in the first closed extremely low position of said opening leaf.

Thus, the hooks are integrated into the chassis and are placed automatically and easily in the low stowed position or the high use position depending on the position of the door.

Advantageously, the opening leaf is mounted on the vertical transport carriage so that the weight of said opening leaf is distributed identically on either side of said carriage, i.e. between the front and the rear of the opening leaf, for balancing thereof.

This solution allows the door, which has a large longitudinal dimension, not to create a cantilever and to be stable during movements thereof.

According to a particularly practical aspect of the present invention, the vertical transport carriage is secured to the post and the opening leaf is mounted so as to be removable and dismountable on the carriage using a pair of mechanical assembly/mounting/centering pins cooperating with two clamping jaws for immobilization thereof.

This solution allows manufacturing most of the door by a contractor or in a particular location of a mounting factory, and then mounting it, depending on the selected options, in an extremely rapid manner on a mounting chain. Hence, the rapidity, economy and practicality of mounting for the workers are combined thanks to this functionality.

Advantageously, the mechanical pins are secured to the vertical transport carriage and the clamping jaws are secured to the opening leaf.

According to a preferred embodiment, the opening leaf includes a conical rotary drum with return spring balancing its weight for passage thereof from the first closed extremely low position into the second open extremely high position, and vice versa, said spring supporting most of the weight of the opening leaf between the two extreme positions.

Thus, the movements of the door are assisted so that the transported weight is as low as possible, which reduces wear of the moving parts and the need for electrical energy of the considered motors.

Preferably, the vertical transport carriage is movable along at least one rail formed on the vertical post.

In particular, the vertical transport carriage is provided with four pairs of guide rollers, two first pairs of vertically superimposed rollers which slide along a first guide rail with a "U"-like section provided on the vertical post, and two second pairs of vertically superposed rollers sliding in a second guide rail with a «U»-like section removably mounted on the vertical post, opposite and parallel to said first guide rail.

This solution enables a lateral and longitudinal "blocking" of the door and therefore an optimized vertical guidance along the vertical post.

Complementarily, the axis of rotation of all of the rollers of the first pairs extends in the longitudinal direction of the body, substantially parallel to the largest dimension of the opening leaf, and the axis of rotation of all of the rollers of the second pairs extends in the transverse direction of the body, perpendicular to the axis of rotation of all of the rollers of the first pairs.

Thus, this allows distributing the forces experienced by the rollers and caused by the weight and the movements of the door.

Preferably, the opening leaf is free of a handle and encloses an electronic board and a transponder for remote automatic opening and closure thereof without human intervention.

Advantageously, in the second open extremely high position, at least 90%, preferably 100%, of the opening leaf overhangs the embrasure of the opening.

Finally, the present invention also relates to a motor vehicle including a body as described before.

BRIEF DESCRIPTION OF THE FIGURES

Other advantages, aims and features of the present invention will appear from the following description, which is given, for an explanatory and non-limiting purpose, with reference to the appended drawings, wherein.

DESCRIPTION OF THE EMBODIMENTS

Figure 1:
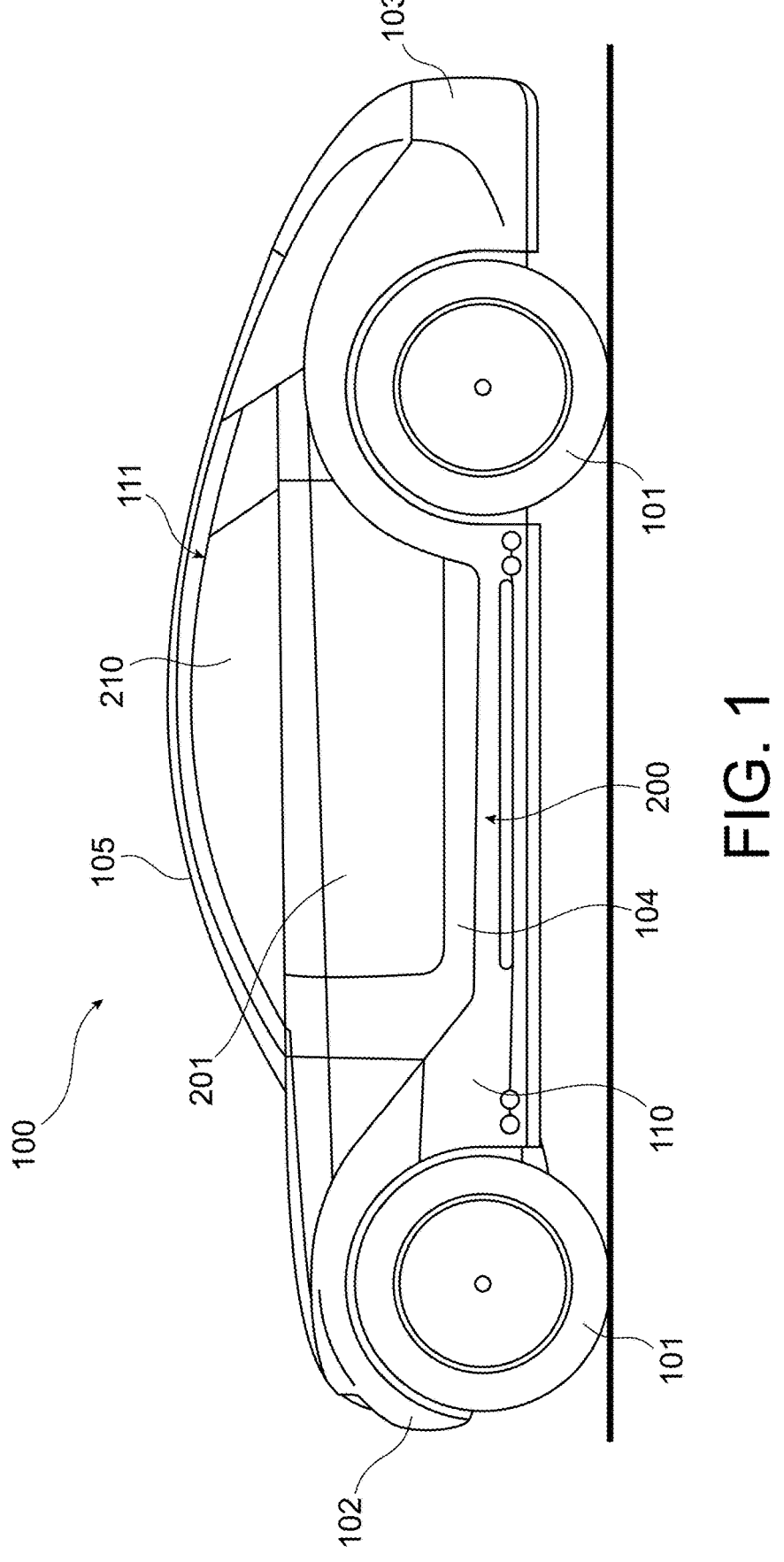
FIG. 1 is a side view of a motor vehicle including a body in accordance with the present invention and provided with an opening leaf in a first closed extremely low position.
Figure 2:
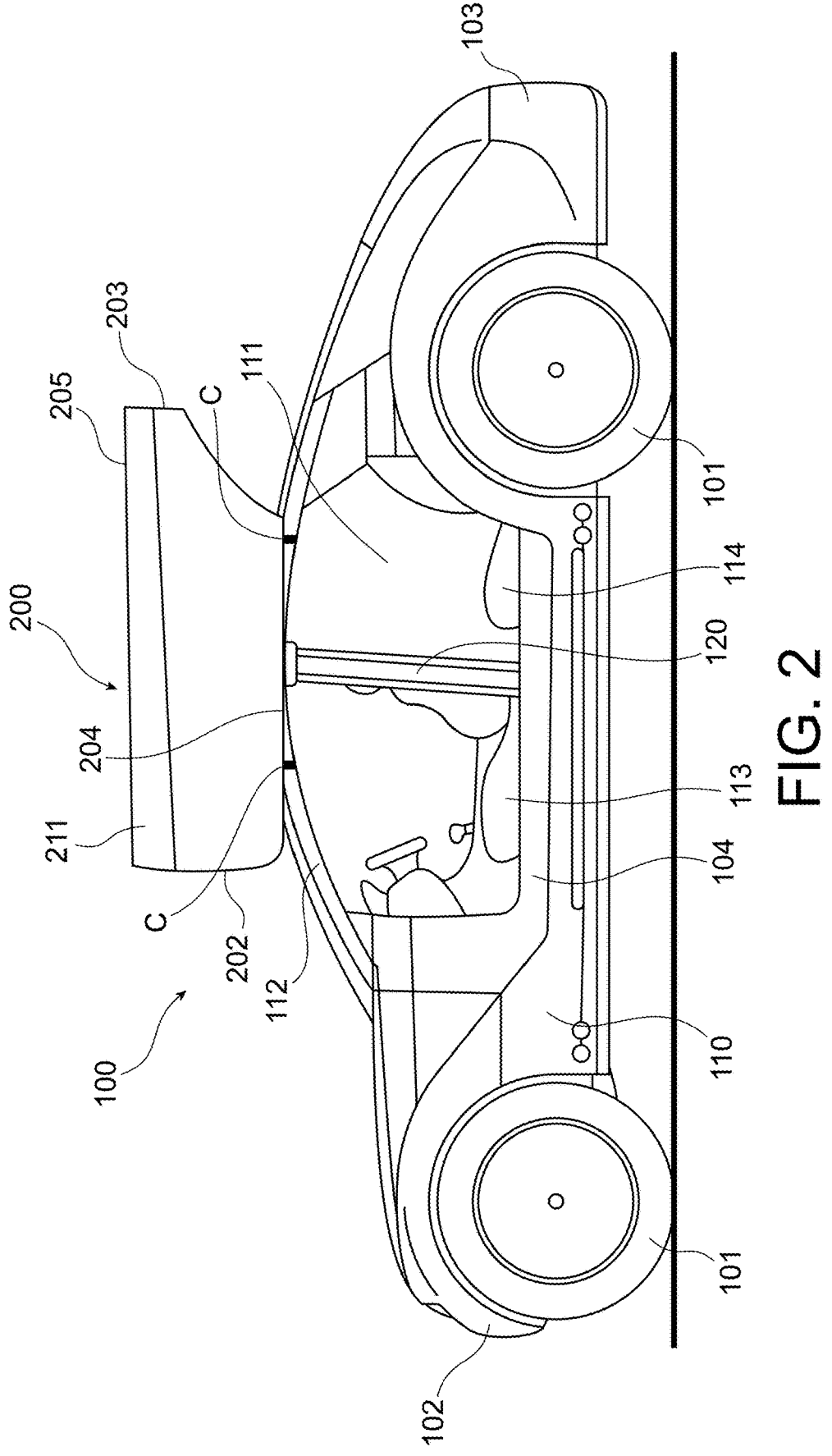
FIG. 2 is a view similar to FIG. 1 wherein the door is in a second open extremely high position.

FIGS. 1 and 2 show a sedan-type vehicle 100 shown in profile view and typically including front and rear wheels 101 topped by a body 110 made of metal (aluminum alloy or steel, with or without carbon element) extending between a front end 102, a rear end 103, a floor 104 and a roof 105 of the vehicle 100.

This body 110 has two right and left side openings 111 each defined by an embrasure 112 (or frame) and allowing access to the front seats 113 (driver or passenger) and to the rear seats 114 (passengers). This side opening 111 is divided longitudinally into a portion for access to the front seats and a portion for access to the rear seats, this division being materialized by a rigid reinforcing vertical post (or mullion) 120 extending essentially between the floor 104 and the roof 105 and having a curvature getting narrow (when looking at the body 110 from the front or from the back) when considered from the floor 104 towards the roof 105.

The embrasure 112 of the considered opening 111 (right and/or left) typically receives an opening leaf 200 materialized by a so-called "double" door, i.e. a car door which, in a first closed extremely low position (FIG. 1), prevents access to both the front seat 113 (the driver in this case) and the rear seats 114, and, in a second open extremely high position, enables simultaneous access to the front and to the rear of the vehicle.

This opening leaf 200 includes a structure 201 (also so-called a door panel) made of stamped metal (steel, aluminum alloy, other material used in the automotive industry) or of thermoformed composite such as glass or carbon fiber, or including both metal portions, for reasons related to rigidity and stress resistance, and portions made of composite materials for reasons related to lightweight.

According to the present invention, the opening leaf 200 is vertically movable according to very particular kinematics which will be described hereinafter. The panel 201 extends between a front upper flange 202, a rear flange 203, a lower flange 204 and an upper flange 205.

After a lateral pivoting outwards of the body 110 and then sliding substantially vertically upwards, this door 200 can take on a second open extremely high position (FIG. 2) in which it does not overhangs laterally beyond the width of the vehicle (the door is therefore so-called "with no overhang") and is raised in the air above the embrasure 112 of the opening 111 and almost the entirety of the roof 105.

The opening leaf 200 includes a flush side window 210, also double (but a version with two independent windows joining vertically in an airtight manner could be considered). The flush side window 210 is movable in translation between a high position or it seals an upper area of the opening 111 of the body 110, while matching with the shape of the upper portion of the embrasure 112, and a base position in which it the flush side window 210 fits into the thickness of the panel 201 of the opening leaf 200 so as to be stowed therein under its upper flange 205, and vice versa. This substantially vertical movement of the flush side window 210 is made possible thanks to an electric motor 206 of a known type integrated into the opening leaf 200 and preferably provided with a gear motor intended to multiply the movement and make it more fluid. The door 200 also includes an electronic board 207 for controlling different actuation elements and for receiving an opening/closure signal emitted remotely by a transponder of a known type. A 36V lithium/ion battery 208 and a current transformer are also integrated into the door 200 to power other motors that will be described later on.

FIGS. 3 to 8 describe in detail and sequentially the different steps of the movement of the opening leaf 200 to switch from the first closed extremely low position (FIG. 1) into the second open extremely high position (FIG. 2).

Figure 3:
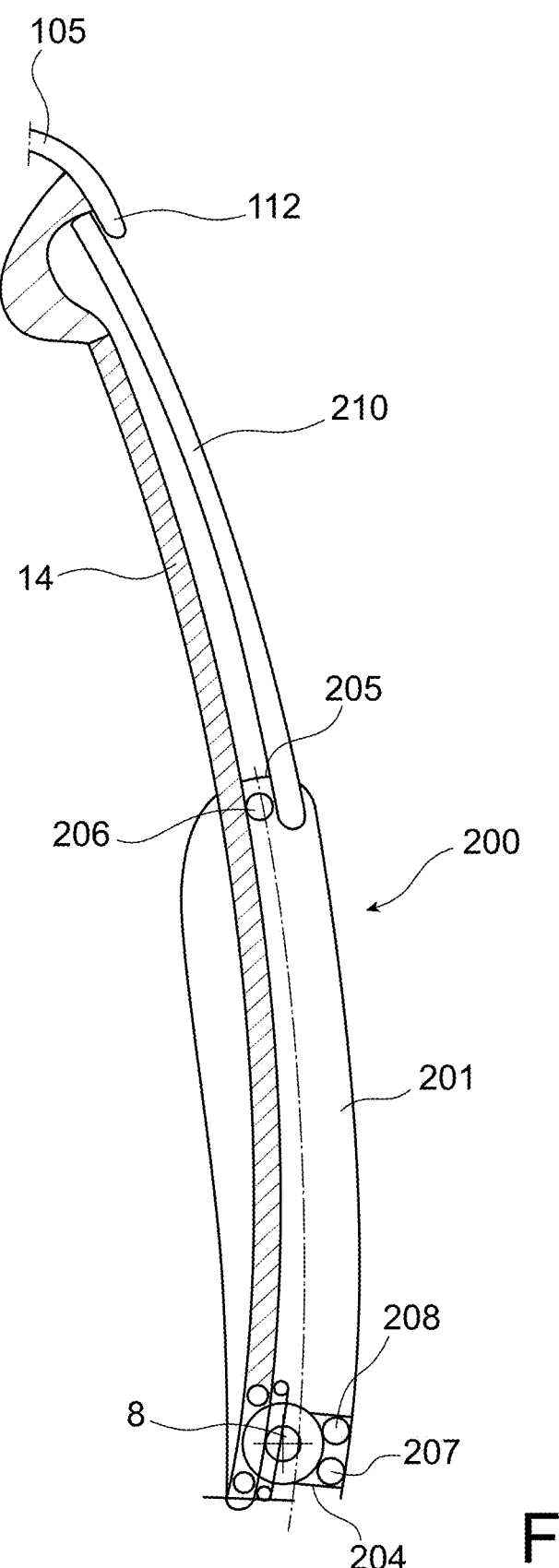
FIG. 3 is a schematic cross-sectional view of one side of the body and of an opening leaf wherein said opening leaf is in a first closed extremely low position.
Figure 7:
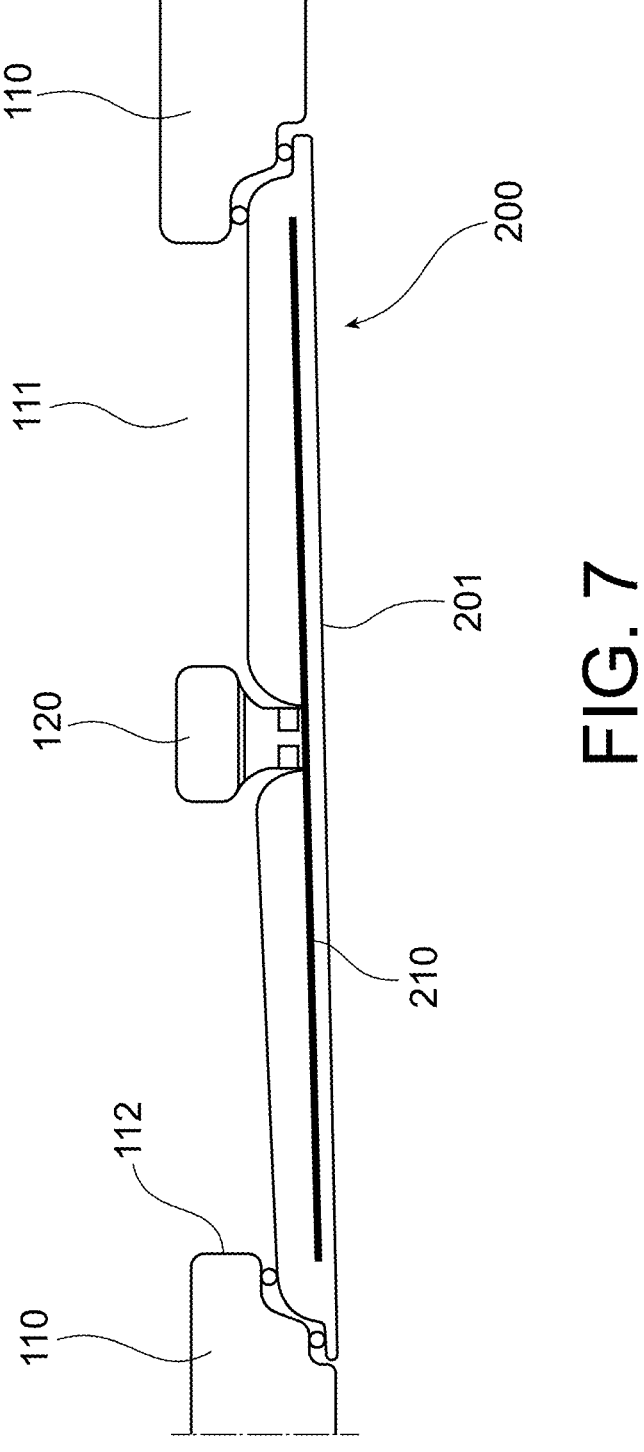
FIG. 7 is a detail view in longitudinal section from above of one side of the body with the opening leaf in the first closed extremely low position.
Figure 8:
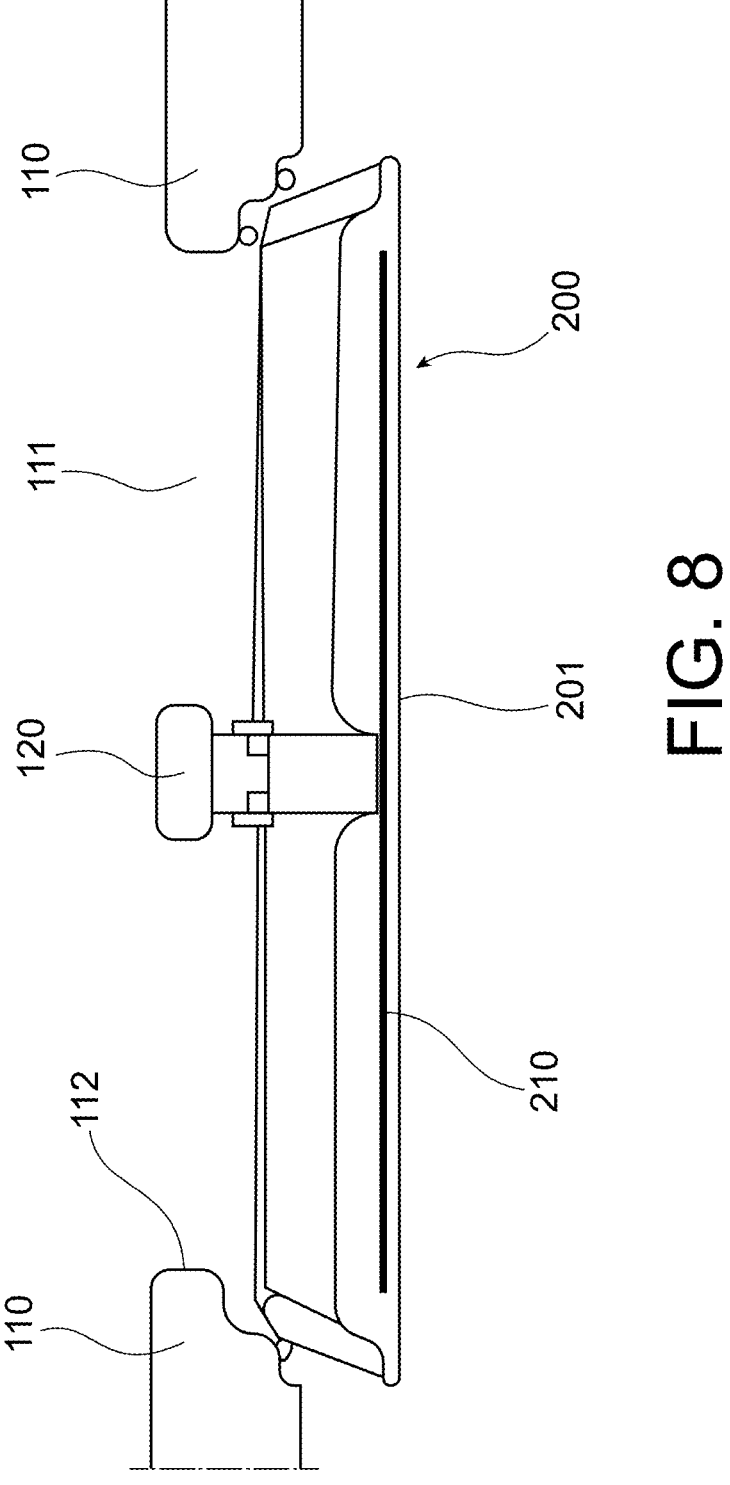
FIG. 8 is a view similar to FIG. 7 wherein the opening leaf is pivoted outwards of the body.

More specifically, in the first position illustrated by FIG. 3 and FIG. 7, the opening leaf 200 seals the entirety of the embrasure 112 of the side opening 111 with which it is associated, and the flush double window 210 is in its sealed closed high position. Hence, the opening leaf 200 is completely closed, the opening 111 is closed in a sealed manner by the rigid panel 201 and by the double window 210, and it is not possible to get in or get out of the vehicle 100. This is the position in which the vehicle 100 is in general when it is moving or parked.

When the driver or a passenger wishes to get in the vehicle, he/she approaches the body 110, a distance of a few meters being sufficient, so that the signal emitted by a transponder (not shown) carried thereby (on a key ring, a magnetic card or integrated in a mobile phone or a smart watch) could be received by the sensor of the electronic board 207 of the opening leaf 200. Once the signal has been received, the opening kinematics are therefore triggered remotely.

Figure 4:
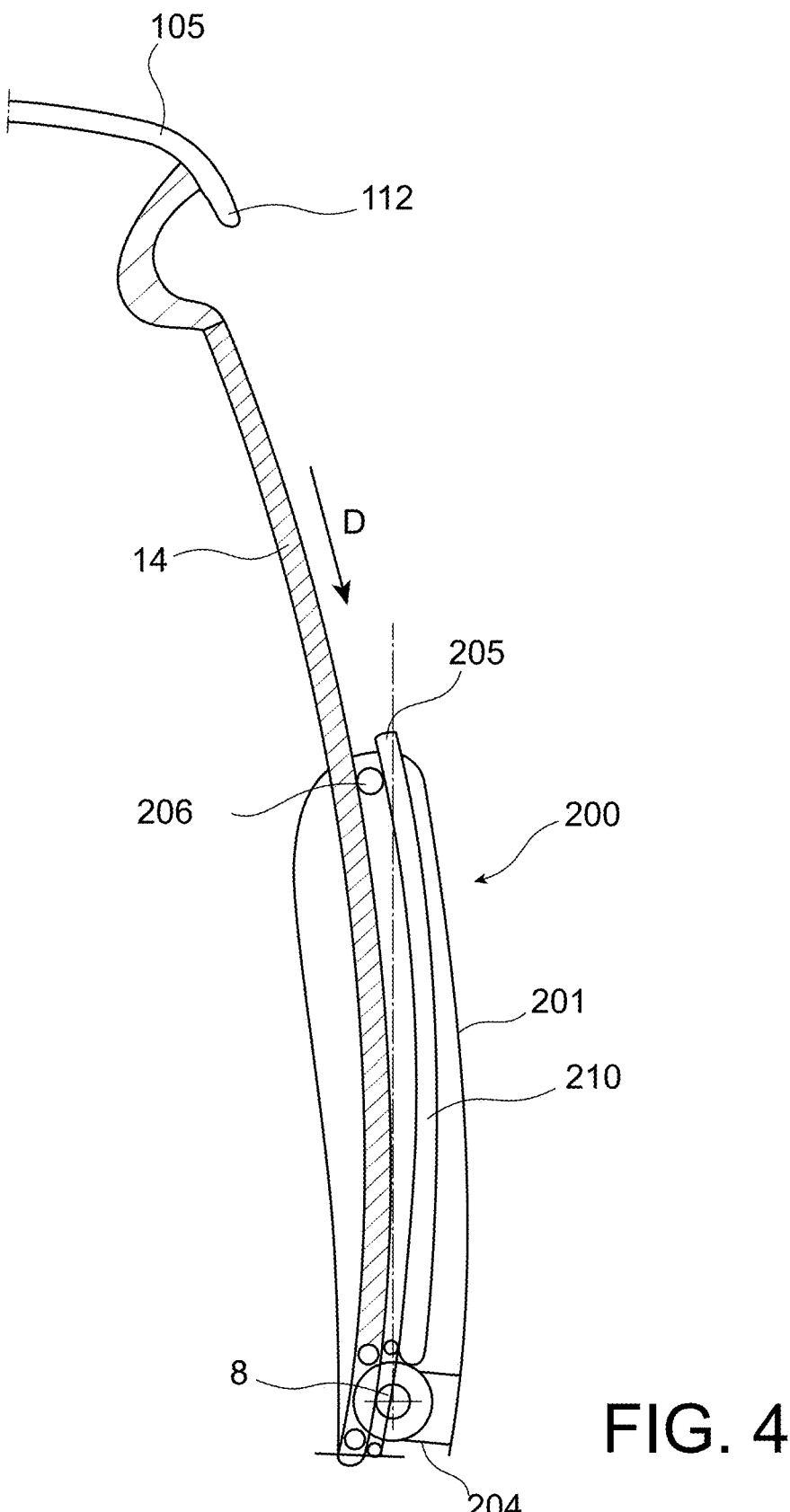
FIG. 4 is a view similar to FIG. 3 wherein the opening leaf is in an intermediate position.

Thus, FIG. 4 illustrates a first intermediate position in which the motor 206 causes the downward movement according to the arrow D of the flush double window 210 within the thickness of the door 200 in order to be completely stowed (it does not, or almost does not, overhang from the upper flange 205). In general, this step lasts a few seconds and allows, in particular, protecting the double window 210 during the subsequent movements and avoiding exposure of the door to a strong wind (reduction of the surface subjected to possible wind gusts which could hinder the rise of the door and even damage its actuation system).

Figure 5:
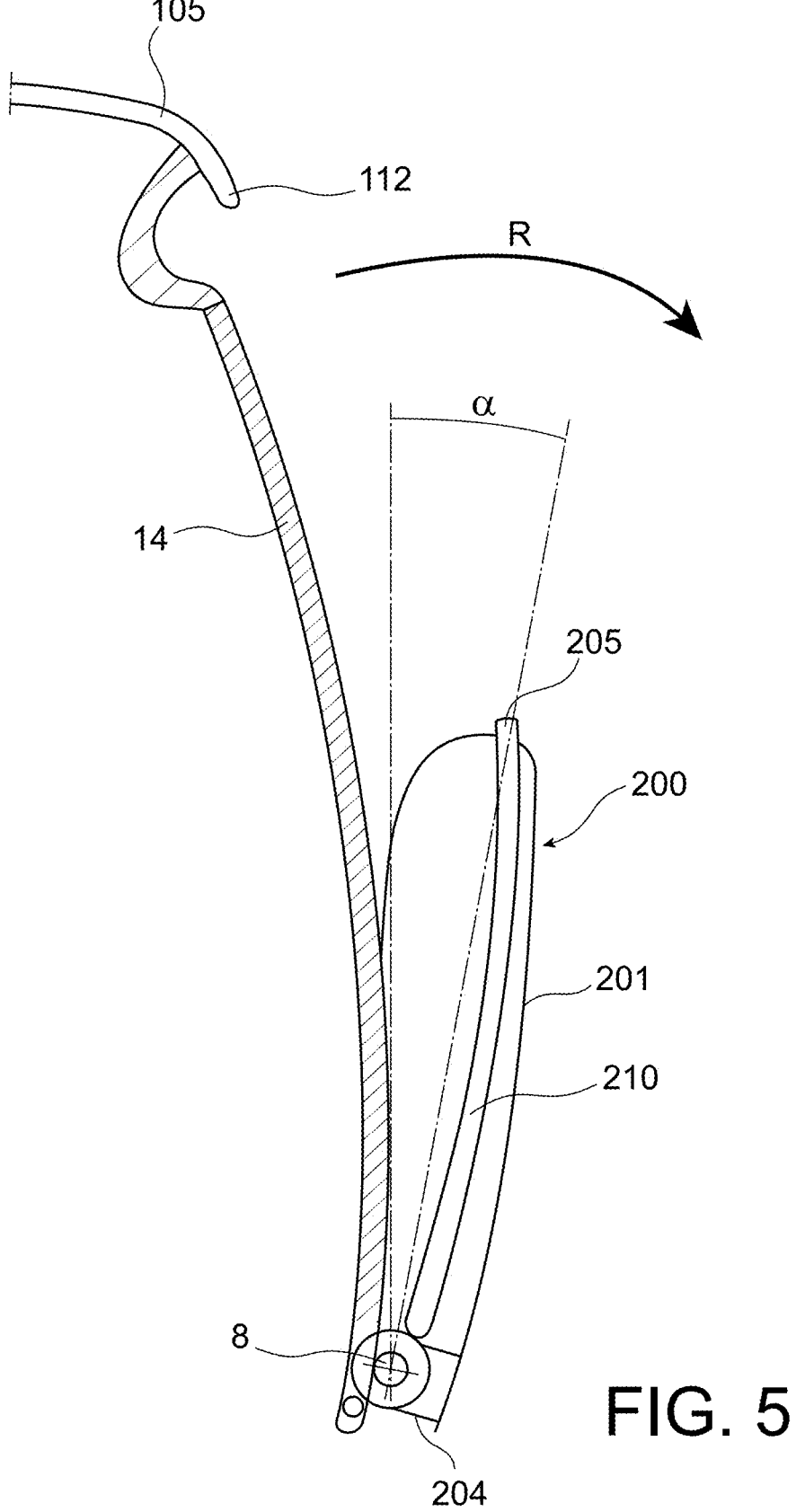
FIG. 5 is a view similar to FIG. 4 wherein the opening leaf is pivoted outwards of the body.

Once the double window 210 has been lowered and accommodated in the panel 201, a motor 9 also integrated into the door 200 makes the latter pivot about a welded longitudinal axis 8 with a large diameter secured to the bottom of the panel 201 according to an angle α of about 10 to 15° in accordance with FIG. 5 so that its upper flange 205 deviates very little from the outer surface of the body 110 (virtual surface defined by the embrasure 112), typically over a distance d (cf. FIG. 8 too) less than 10 cm, and even less depending on the curvature of the door and of the body.

More specifically, as shown in FIGS. 3 to 6, given the curvature of the body 110, which generally always narrows according to a certain curvature from the floor towards the roof (in particular for reasons related to aerodynamics/SCx and aesthetics), the maximum lateral spacing of the opening leaf 200 at the level of its upper edge 205 is actually very small compared to the width of the body 110 measured at the level of the floor 104. Indeed, in the closed position of the door 200, the upper edge 205 of the latter is actually located slightly set back a few centimeters towards the inside of the body 110 with respect to the outer lateral edge of the floor 104. Thus, when the door 200 tilts outwards, its upper edge 205 is actually almost not overhanging with respect to the outer edge of the floor 104 (when looking at the vehicle from above like in FIG. 8). In the case of a relatively large curvature of the body 110 and/or of an upper flange 205 of the door 200 that is large enough (a SUV-type vehicle and/or a window with a small height, like in coupés or sports cars), the lateral overhang of the door 200 at the level of its upper flange 205 (a point logically furthest away from the outer surface of the body) with respect to the outer edge of the floor 104 could even be zero, including after tilting of the door 200 outwardly in accordance with FIG. 5.

Thus, these very particular kinematics and this very innovative aspect of the present invention have a considerable advantage over all of the solutions of the prior art in terms of lateral bulk since the door 200 can open even though the vehicle 100 is located very close to a potential obstacle such as a wall, a low wall, a post or another car parked laterally beside. Even though it is performed outwardly in the direction of the person who opens it, the tilting movement of the door 200 is absolutely not disturbing and does not pose any risk. Quite the contrary, as set out in the introductory part of the present application, there is no longer any risk of a cyclist, a motorcyclist or another vehicle (truck, car) hitting the door 200 in its open position since the latter does not, or almost does not, overhang laterally beyond the body 110. Hence, this solution is extremely effective in terms of road safety, which is well-known to be a major national concern.

Figure 6:
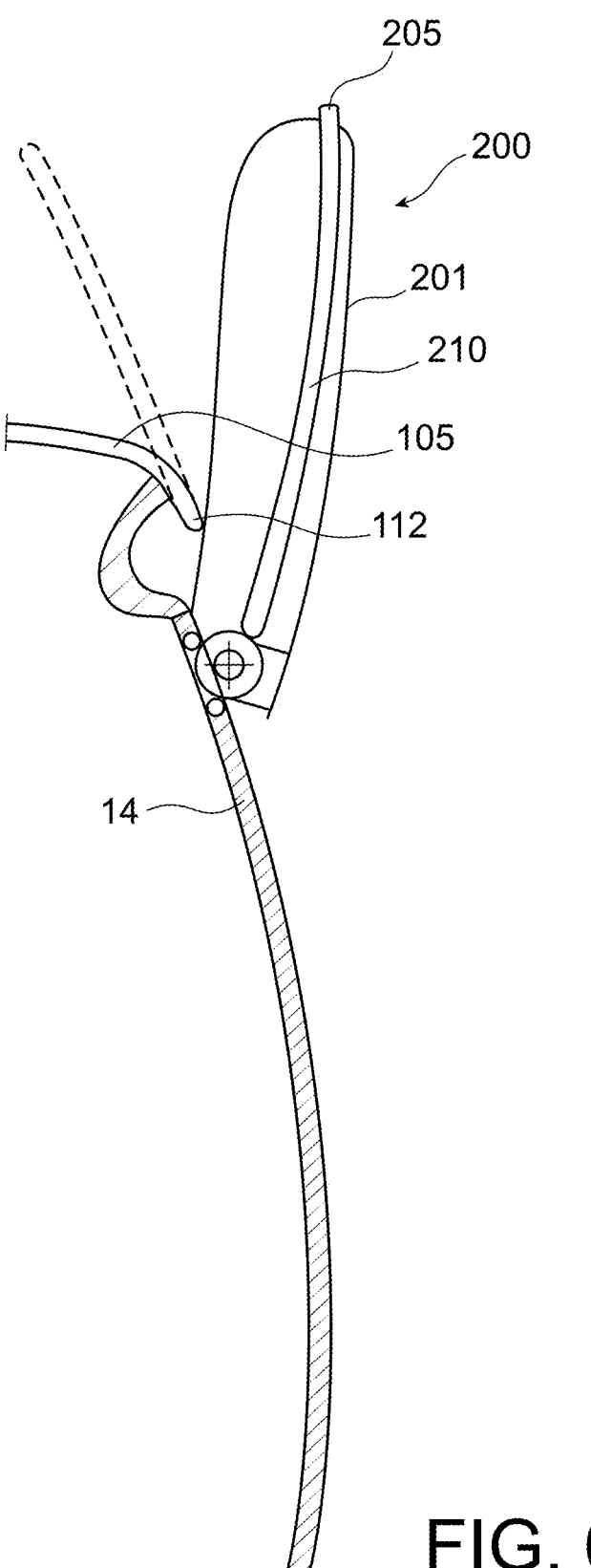
FIG. 6 is a view similar to FIG. 5 wherein the opening leaf is in a second open extremely high position.

Once the door 200 is tilted outwards of the body 110, the latter is moved upwards along the curved central post 120, still automatically, in order to reach the second open extremely high position, as illustrated by FIG. 6. In this position (also illustrated by FIG. 2), the door 200 is thus placed at its highest point and it is held by means of lower hooks C in order to avoid moving (inadvertent descent or vertical pivoting) so that people could get in the vehicle 100 at the front as well as at the rear.

Once people are inside the vehicle, the mechanism used to pivot and raise the door 200 operates in a reverse manner, i.e. the door 200 descends along the central post 120 down to its lowermost position (FIG. 5), then the panel 201 pivots laterally to fold against the body 110 (FIG. 4) and finally the double window 210 comes out of the panel 201 and rises to close the opening 111 of the body 110 in a sealed manner (FIGS. 3 and 1).

FIGS. 9 to 15B show in detail mechanical means for docking the opening leaf 200 on a carriage 1, and means for pivoting and then translating said door 200 on the vertical post 120 according to the intended kinematics.

Figure 10:
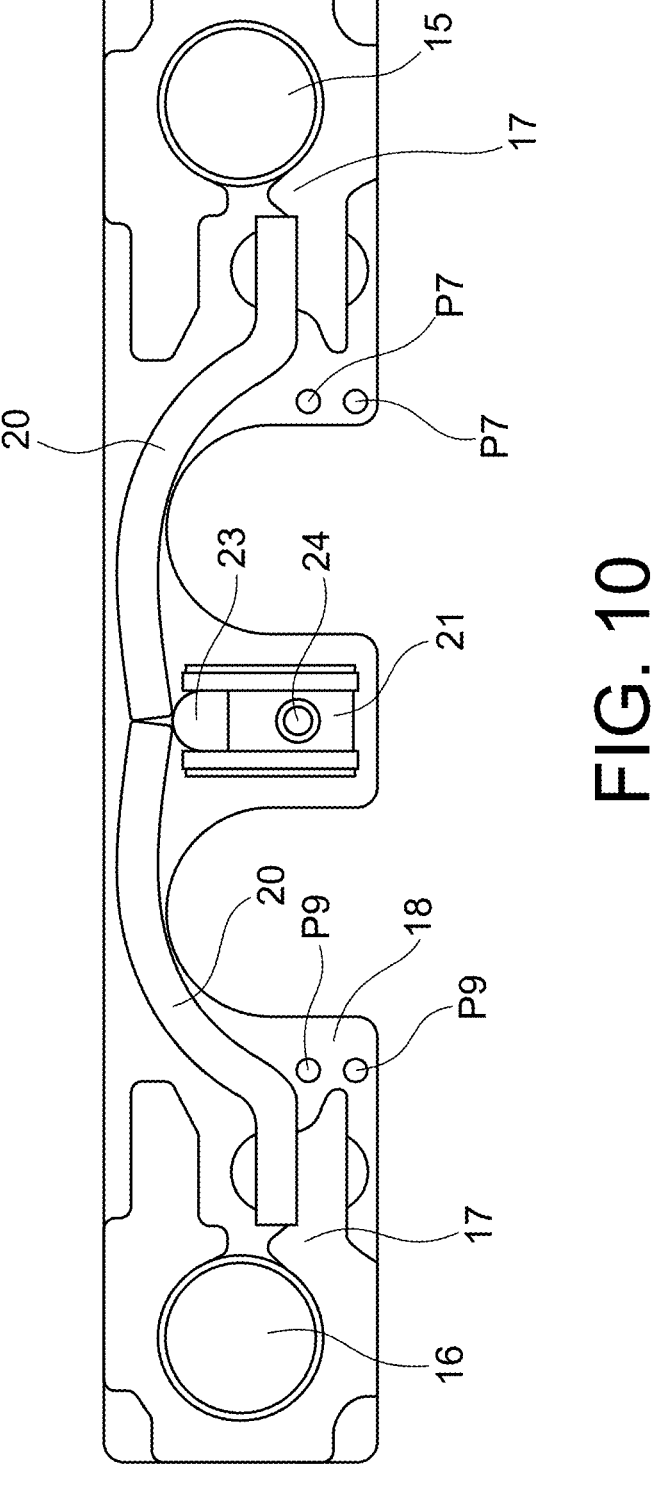
FIG. 10 is a bottom view of the opening leaf showing means for docking to the transport carriage.
Figure 11:
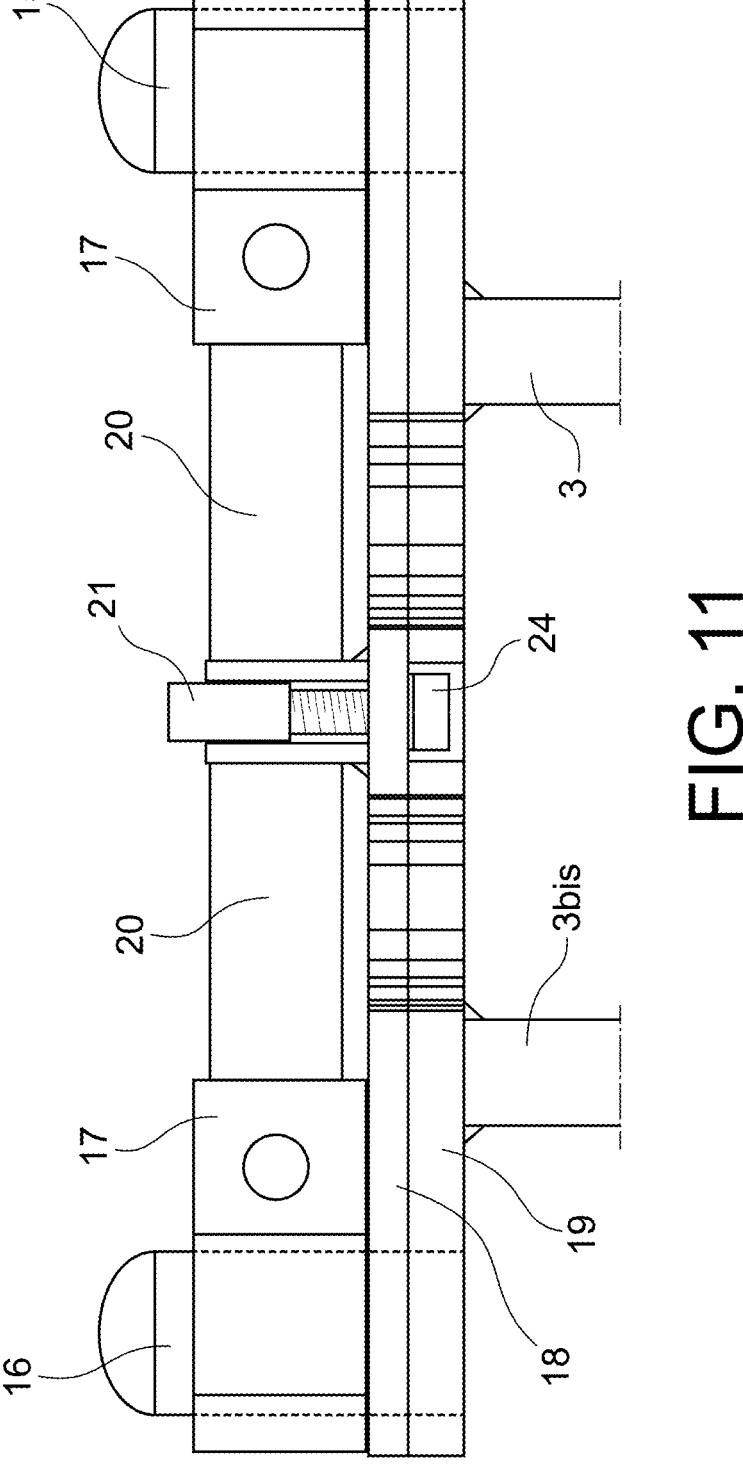
FIG. 11 is a longitudinal sectional view of the carriage and of a portion of the opening leaf affixed on the latter
Figure 12:
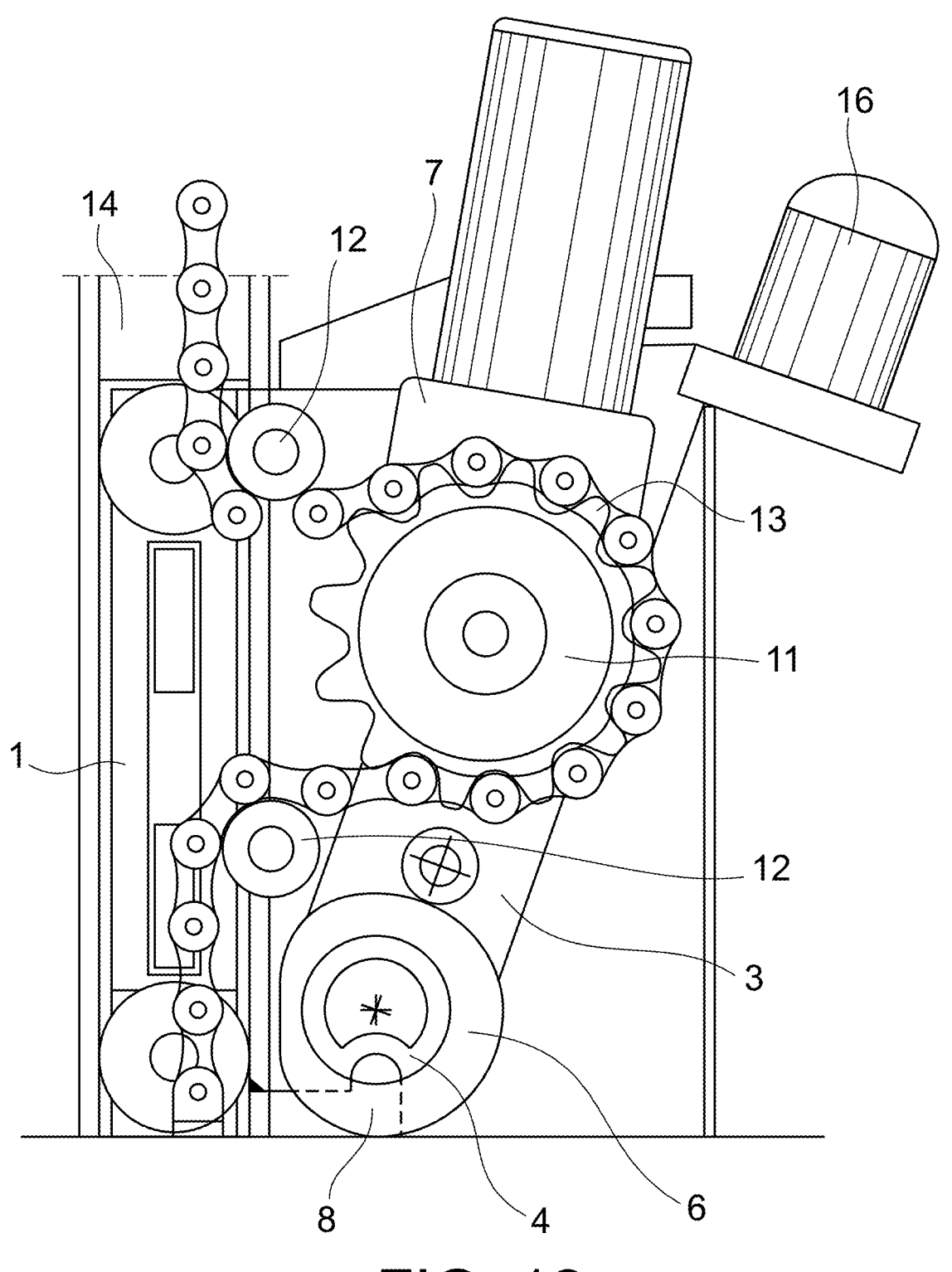
FIG. 12 is a sectional view of mechanical pivot elements of the opening leaf.
Figure 13:
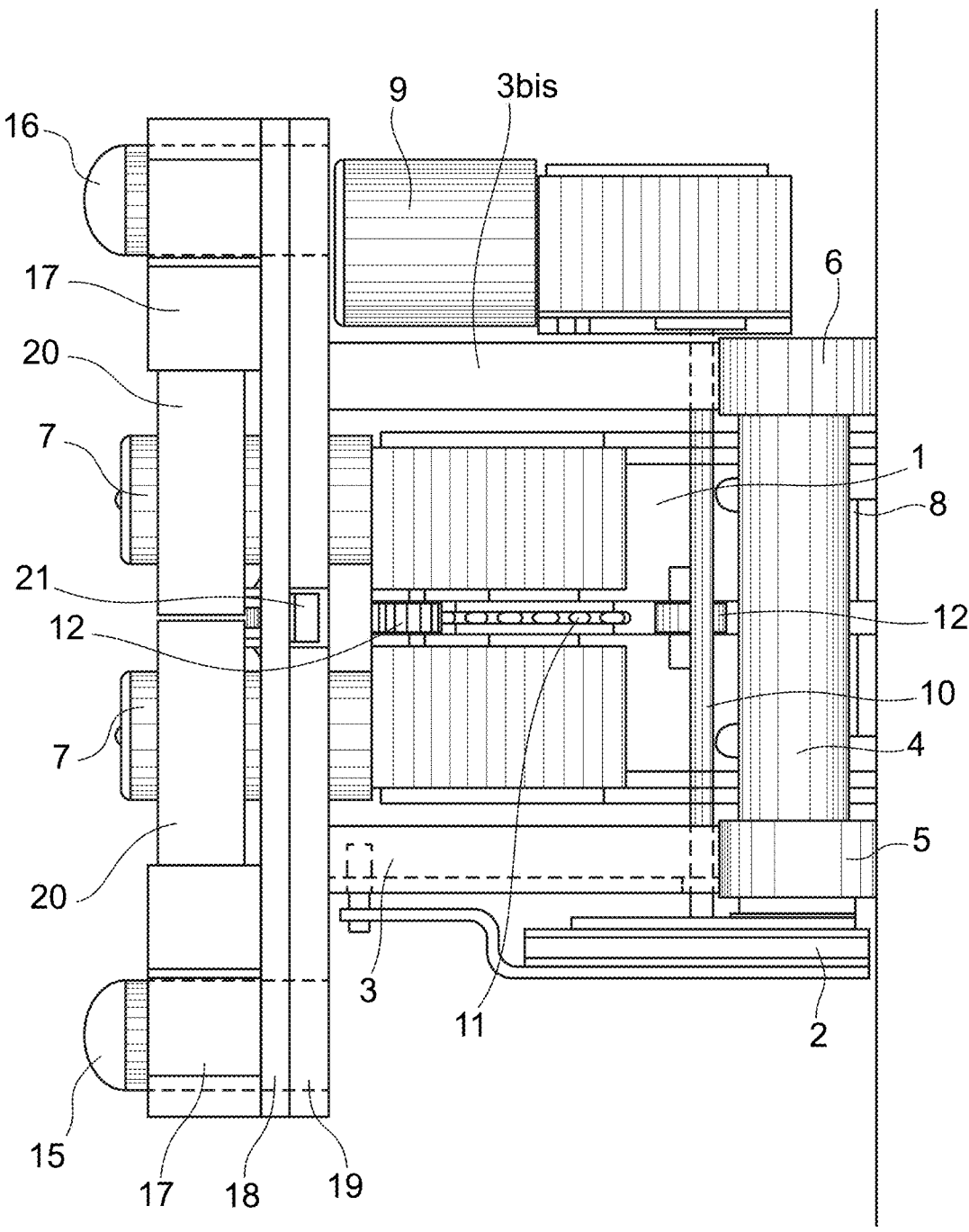
FIG. 13 is another longitudinal sectional view of translation means of the opening leaf.

To this end, as illustrated in detail in FIGS. 10 and 11 illustrate a bottom view of the opening leaf docketing to the transport carriage band a longitudinal view of the transport carriage showing a portion of the opening leaf affixed on the transport carriage. The panel 201 of the door 200 includes, on its bottom low portion and at its center, an aluminum plate 18 which is welded to the structure of the door, itself made of welded profiled sections to form the double-thickness panel. A second aluminum sheet metal serves as the external skin of this low panel 18 and is lacquered with the body color. This outer skin is assembled by screws and by baffles accessible from inside when the door 200 is open, which makes this outer sheet metal removable for maintenance without having to intervene on the internal linings.

Another important aspect of the present invention is that the door 200 forms an element independent of the body 110 and can therefore be shaped on demand (specific order of the customer, adaptation to different vehicle models) and be supplied at the last moment on an assembly line of a vehicle manufacturing plant in order to be assembled to the body 110. Indeed, mounting of the opening leaf 200 is intended to be extremely simple and intuitive. Typically, the latter can be performed in less than 10 seconds, in particular with an assist robot which carries and positions the door 200 the closest to the carriage 1.

Thus, the door 200 can easily hook onto the carriage 1 by means of a system of clamping jaws and a positioning pin.

Figure 9:
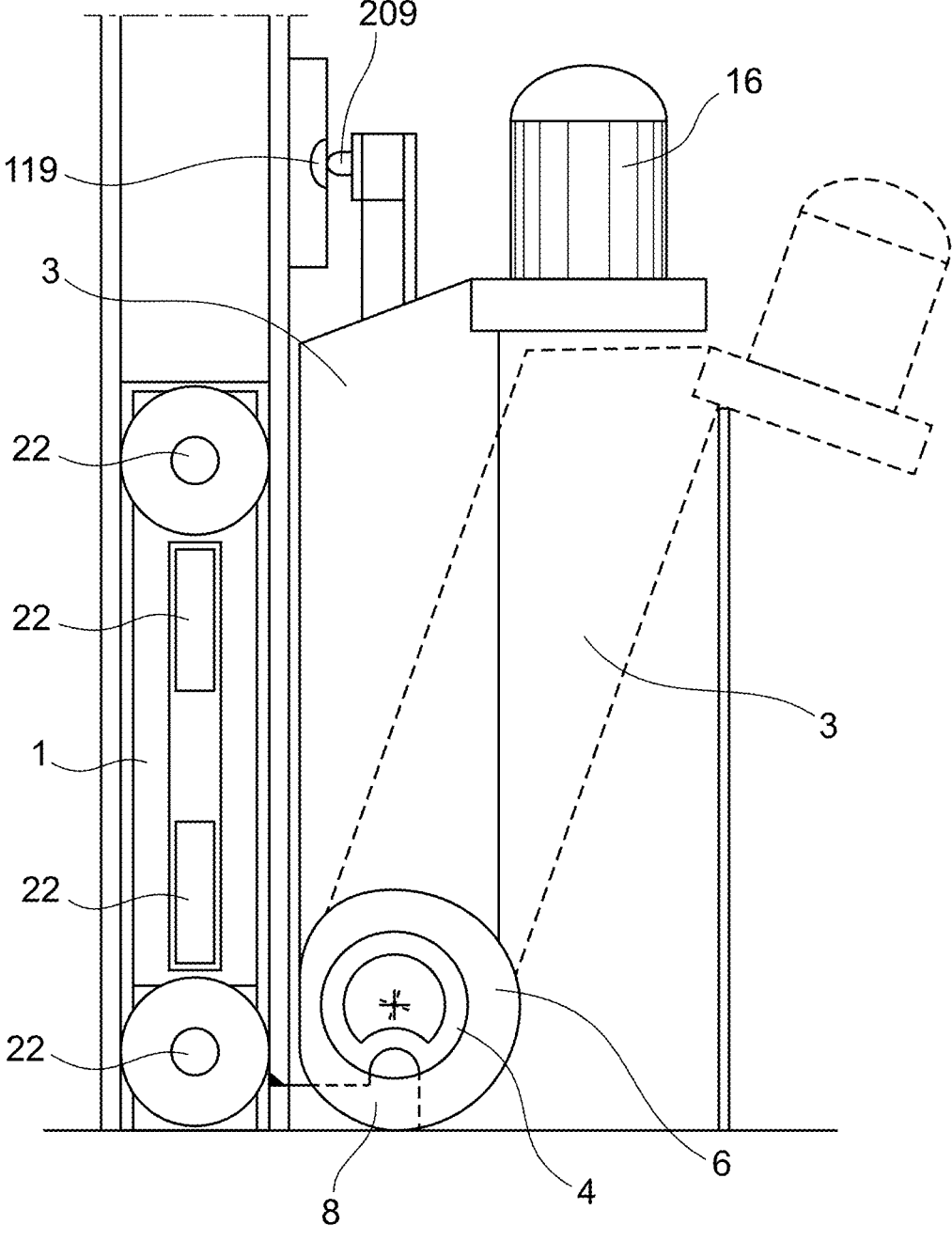
FIG. 9 is a schematic sectional view of a profile of a transport carriage of the opening leaf in a closed position (solid lines) and in a pivoted position (dotted lines)

To this end (FIGS. 9 and 10 illustrate sectional and bottom views of the opening leaf), the aluminum plate 18 receives a mounting/clamping system including two jaws 17 for example made of aluminum, cams 21 and 23 and one single screw 24 which acts on these by means of lever arms 20 made of steel so as to clamp the jaws 17 on vertical docking pins 15 and 16 directed upwards which are secured to a plate 19 made of steel secured to the carriage 1.

More specifically, a rotation of the central screw 24 in one direction (for example clockwise) results in clamping of the jaws 17 around the docking pins (also so-called mounting lugs) 15 and 16 thanks to the synchronized pivoting movement of the arms 20 pushed by the cams 21 and 23.

It is also during this docking that an electrical contact is established between the bottom of the door 200 (at the level of the plate 18) and motors 7 and 9 of the carriage 1 by means of connection pads P7 and P9 connected to the battery 208. Thus, this electrical connection enables the battery 208 of the door 200 to power the motors 7 and 9.

The opening leaf 200 is also provided with a charging pad 209 cooperating, only when said door is closed (solid lines of FIG. 9), with a connector 119 of the body 110 to recharge said 36V internal battery 208 of the door 200 with the battery 12V or 14V of the vehicle 100. It should be noted that the autonomy of the integrated battery 208 allows ensuring about twenty opening/closure operations of the door 200 without the need to be recharged.

It should be noted that the door 200 is mounted in a perfectly balanced manner on the carriage 1 so that its center of gravity is aligned with the center of the vertical post 120. This avoids a difference in weight between the front and the rear of the door 200 which could unbalance and/or impair movement thereof (lateral pivoting outwards and vertical translation).

The means for lateral pivoting of the door 200 relative to the body 110 (passage from FIG. 4 to FIG. 5) primarily include a longitudinal shaft 8 with a large diameter fastened by welding on the carriage 1, a motor 9 for driving a shaft 4 pivotably mounted inside the longitudinal shaft 8 and resting on front 5 and rear 6 bearings. Also, the means for lateral pivoting of the door 200 relative to the body 110 primarily include a planetary reduction gear 2 connected to the drive motor 9 by means of a shaft 10, arms 3 and 3b is connected on the one hand to the bearings 5 and 6 and on the other hand to the rigid steel plate 19 secured to the carriage 1. The planetary reduction gear 2 allows multiplying the force exerted by the drive motor 9 to make the panel 201 pivot by means of the longitudinal shaft 8 and the bearings 5 and 6.

In turn, the vertical actuation means of the door 200 primarily include a double motor 7 mounted on the carriage 1, a chain drive pinion 11, a fixed chain 13 mounted partly meshed in the teeth of the pinion, tension satellite rollers 12, and U-shaped rails 14 secured to the central post 120 and receiving 4 pairs of steel rollers 22 with integrated precision ball bearings circulating between the wings of the U-shaped rails defining rolling tracks to guide the door with no backlash during movements thereof from top to bottom and vice versa, while avoiding any pivoting movement according to a vertical axis and any transverse (right/left) and longitudinal (front/rear) movement relative to the body 110.

More specifically, the double motor 7 performs raising and lowering of the panel 201 of the door 200 by rotating the chain pinion 11, which meshes in the chain 13 acting as a stretched rack between the two satellite rollers 12 and fastened to the ends of U-shaped rails 14. Rotation of the double motor 7 in one direction makes the door 200 rise along the curved rails 14, the different (4) pairs of rollers 22 with precision ball bearings allowing perfect guidance with no backlash of the door 200 along said rails 14.

Figure 14:
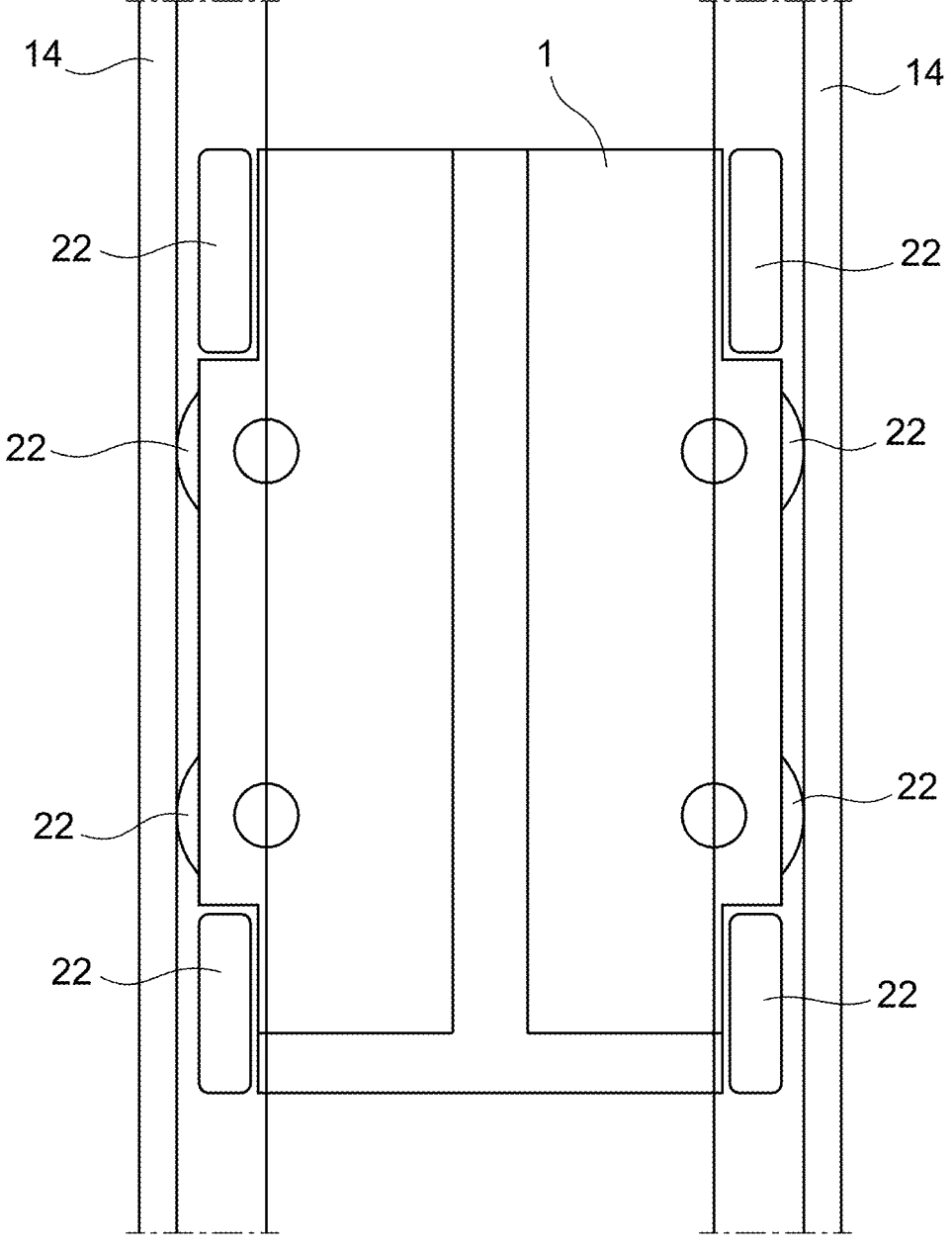
FIG. 14 is another detail view of central post slide rails.
Figure 15A:
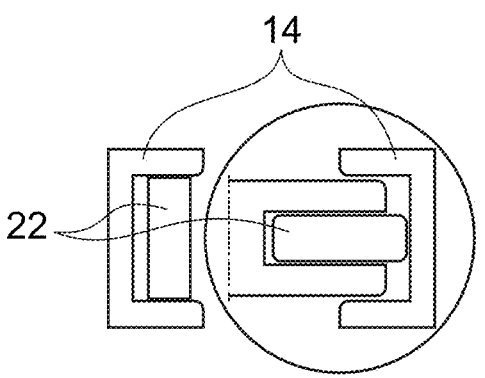
FIG. 15A is a partial section view showing the relative positions of the rails and the roller.
Figure 15B:
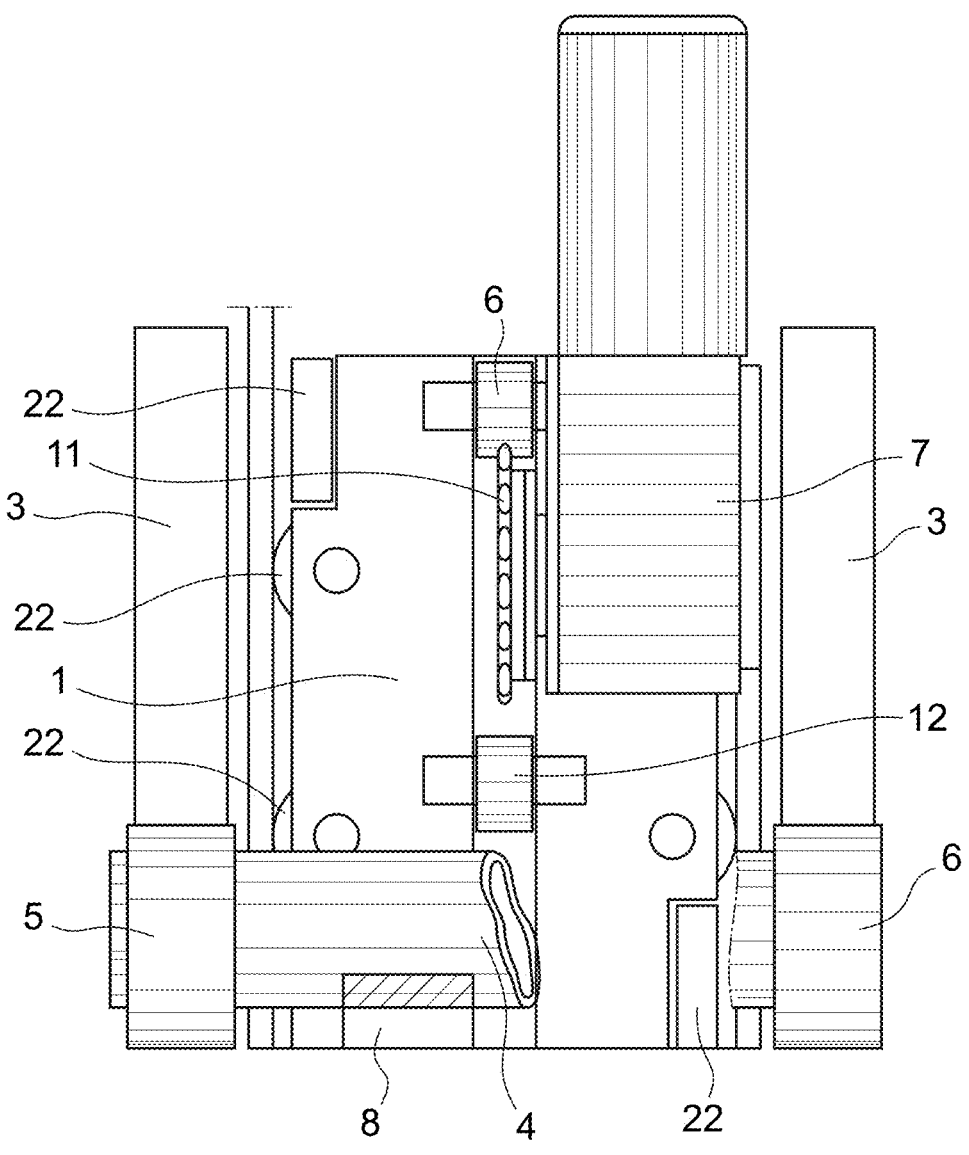
FIG. 15B is a detailed sectional view of the opening leaf and of the actuation means.

To this end, as shown in FIG. 14 of the central post rails, first two pairs of rollers 22 superposed in pairs are arranged in a first U-shaped rail 14, first U-shaped rail 14 (welded to the carriage 1, with their respective axes of rotation extending transversely to the vehicle (perpendicular to the direction of travel of the latter) to avoid any movement of the door 200 from the front backwards and vice versa, whereas second two ether pairs of rollers 22 superposed in pairs are arranged in second U-shaped rail 14, second U-shaped rail removably mounted on the carriage 1 opposite the first rail, with their respective axes of rotation arranged longitudinally, perpendicularly to the axes of rotation of the first pairs of rollers 22, so as to avoid movements from the right to the left and vice versa of the door 200. Moreover, this enables the door to withstand possible wind gusts.

The rotation of the double motor 7 in the reverse direction allows lowering the door 200 from the second open extremely high position (FIGS. 2 and 6) to the first closed extremely low position (FIGS. 1 and 3), which remains permanently guided by the pairs of rollers 22 circulating inside the U-shaped rails 14

When the door 200 is in its second extremely high position, the hooks C which hang under the lower flange 204 of the panel 201 naturally hook into compartments provided to this end in the upper portion of the embrasure 112 of the opening 111 (cf. FIG. 2). Thus, this allows flanging at three points (central position at the level of the transport carriage 1, front end and rear end at the level of the hooks C) of the door 200.

Figure 16:
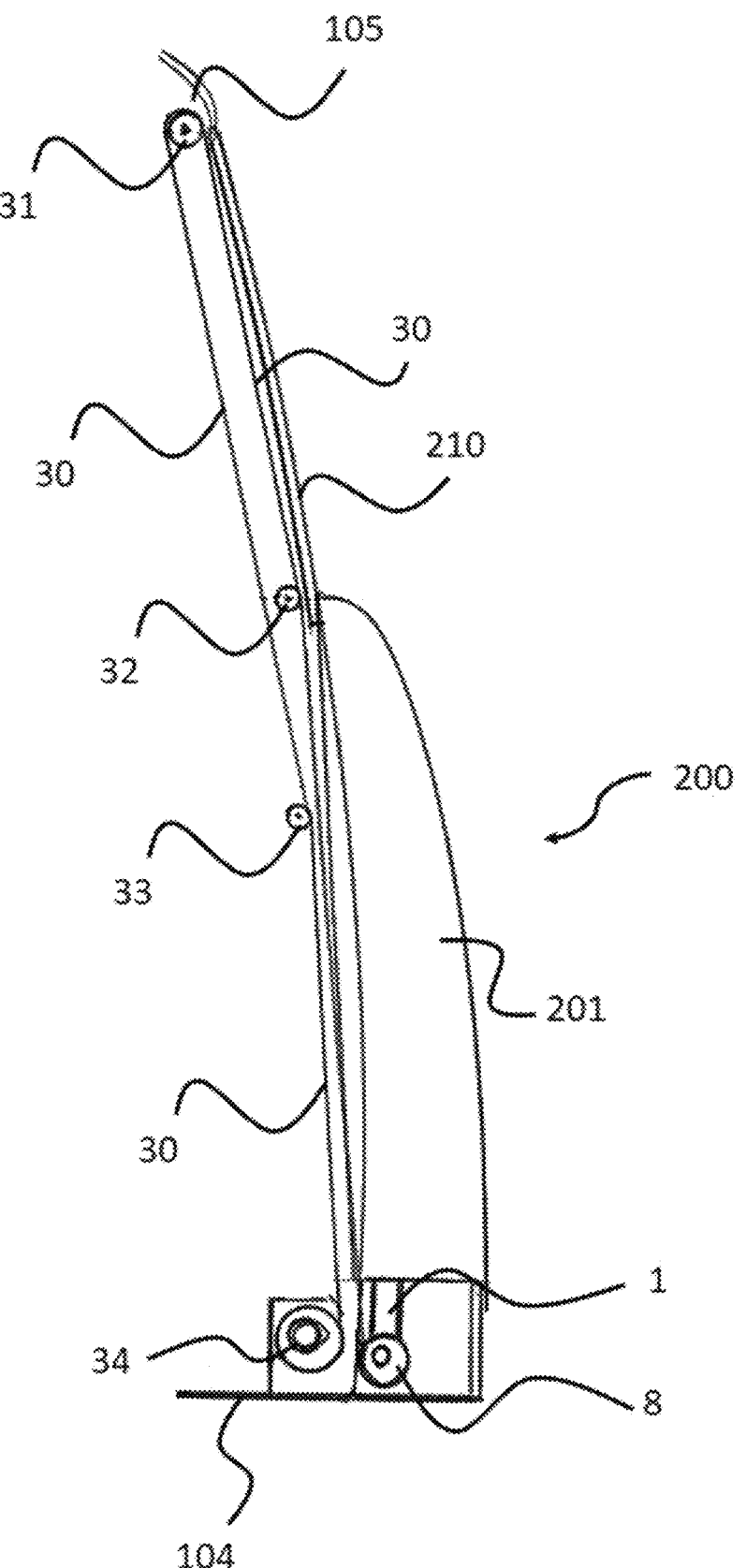
FIG. 16 is a schematic sectional view illustrating, in a first position, a balancer-type belt system for compensating for the weight of the opening leaf.

The control system (electronic board) is informed that the hooks C arrive in engagement in the embrasure 112 of the opening 111 when the torque of the double motor 7 suddenly increases, which indicates that the hooks C hold the door 200 and cannot rise higher. Thus, the double motor 7 ensures holding of the door 200 as long as the reverse rotation instruction has not been given by the electronic control board. More specifically, a spring-loaded "counterweight" and spiral drum system shown in FIG. 16 is provided to hold the door in the high position in order to relieve the double motor 7 as soon as the hooks C are engaged with the embrasure, which allows stopping the double motor 7.

When an instruction for lowering the door 200 is given, the double motor 7 rotates in the reverse direction so as to make the chain 13 run in the opposite direction and to lower the carriage 1 and the door 200. Once the door 200 has reached the first closed extremely low position (FIGS. 1 and 3), the hooks C hanging from the lower flange 204 of the door could fit into compartments provided to this end in the lower portion of the embrasure 112 of the opening 111.

Each door has its own electronic board for servo-controlling the motors with software stored in memory containing an associated control logic to generate the automated movements. This logic should integrate, for each motor, the torque, speed and direction of movement setpoints of the considered parts (window, pivot axis, carriage) for opening/closure, stoppage of the motors (including safety stoppage in case of an excessive load measured in particular in case of an obstacle, for example beyond 10 daN).

The body 110 may be internally provided with at least one control button (either a physical button or a command via the integrated system of the dashboard) to control opening of each door 200 or of all doors 200 according to the kinematics indicated before. A button of the same type may also be provided at the level of the rear passengers, but it will be lockable/unlockable by the driver for safety reasons. Advantageously, somehow like electric window management systems, the driver will have a button for each door.

A backup battery connected to the electronic control board of the door 200 may be provided inside the body 110 of the vehicle 100 for the event where the battery integrated in the opening leaf 200 would be defective or discharged, that being so in order to enable opening/closure of said door by safety through at least one complete cycle.

According to one alternative, it is possible to use one single motor 7, whose gear motor is of the planetary type (the pinions 11 meshing with the chain 13) to enable the user to raise or lower the door manually using the reversibility characteristics of this motor drive type. This manual disengagement solution allows avoiding a complicated and expensive backup system. A system of a barrel and pins mounted on return springs to engage the motor shaft with the pinions of the sun gear and to disengage them could be used in order to easily disengage the drive shaft and the pinions of the planetary system.

In a corollary manner, the carriage 1 and double door 200 assembly could be equipped with a counterweight lifting assist device, also known as balancer.

Figure 17:
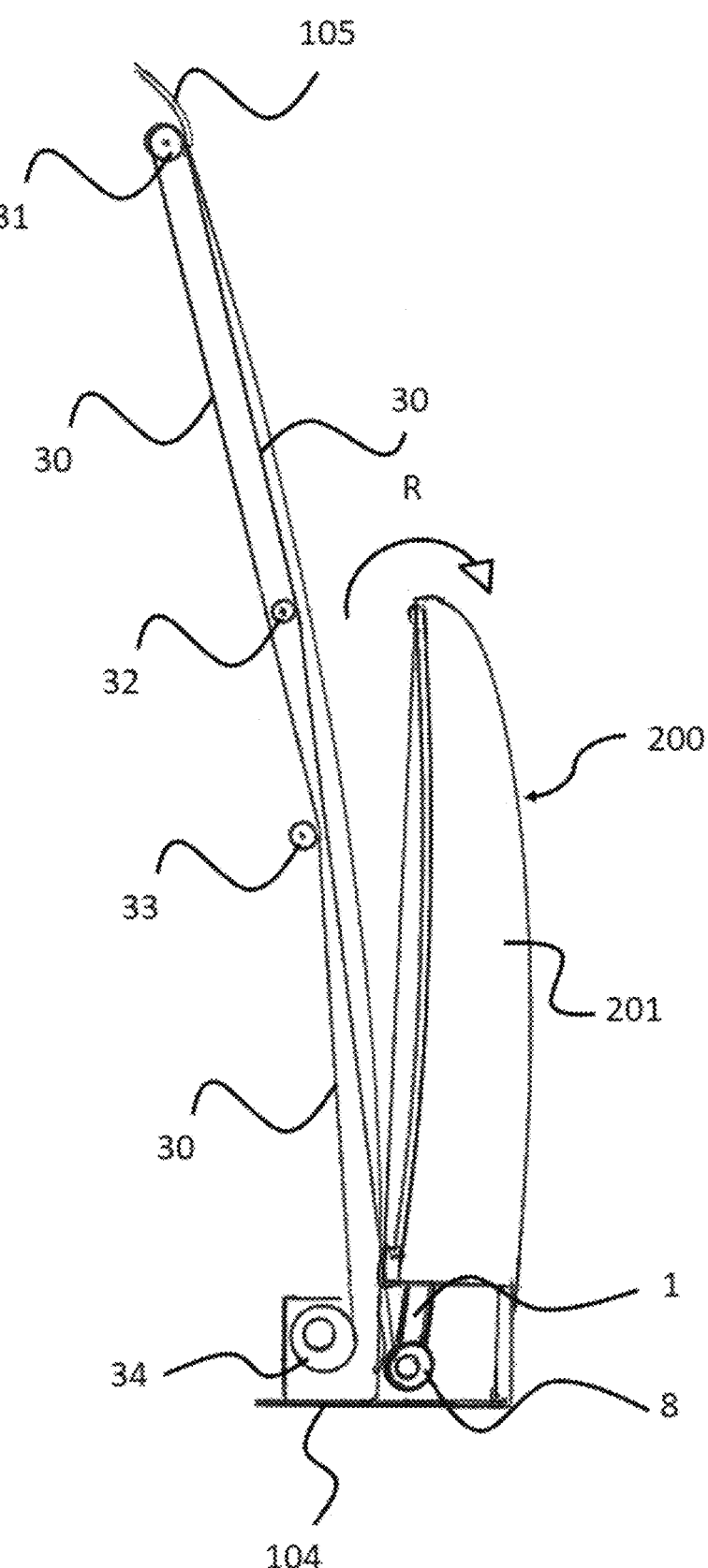
FIG. 17 is a schematic sectional view illustrating, in a second position, a balancer-type belt system for compensating for the weight of the opening leaf.
Figure 18:
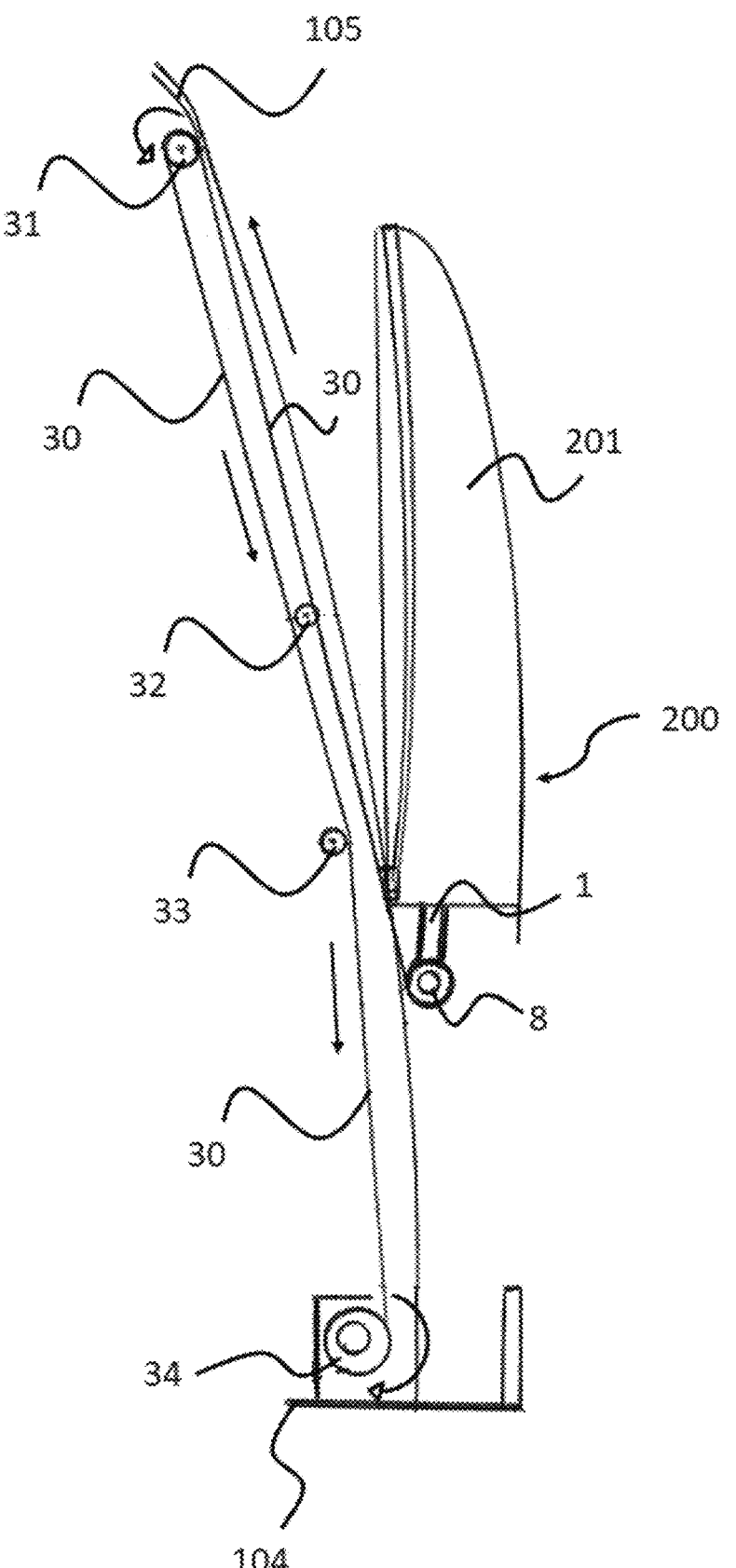
FIG. 18 is a schematic sectional view illustrating, in a third position, a balancer-type belt system for compensating for the weight of the opening leaf.

Thus, as illustrated in FIGS. 16 to 18, an aviation-type braided metal cable 30 (great flexibility and high strength) is secured to the lower portion of the carriage 1. This cable 30 is tensioned around a first upper pulley 31 positioned in the post 120, close to the roof 105. The cable 30 bears beforehand against a first intermediate curvature pulley 32 before being wound around the first upper pulley 31 over about one half-turn. After its half-turn around the first upper pulley 31, the cable 30 descends to be wound around a conical rotary drum 34 of a known type (in particular for industrial door) with a return spring positioned close to the front safety belt, against the floor 104. The cable 30 bears beforehand against a second intermediate curvature pulley 33 placed below the first intermediate curvature pulley 32. The cable 30 is wound around the conical rotary drum 34 with a return spring for example over several turns and allows creating a simple, compact and effective balancer, which creates a constant counterweight irrespective of the vertical position of the door 200, upon opening as well as upon closure.

Thus, when raising the door 200, the counterweight created by the conical rotary drum 34 with a return spring relieves the carriage 1 and enables the door 200 to remain in the high position without descending again. Similarly, when lowering the door 200, the counterweight, conversely, allows avoiding a sudden drop in the latter down to its low position.

A backup latch could be provided in a location of the body 110 located close to the opening leaf 200 so as to unblock opening thereof for backup use in the event where the transponder would not function, or the electronic board would be defective, or the battery would be discharged. To this end, a key could be integrated into the transponder, as usually done.

Thus, the present invention allows making a double door 200 (giving access to the front and rear seats of the same flank) for mass industry which safely allows for an absence of lateral bulk thanks to a vertical retraction with no overhang. This feature will also allow easy access for a person on a wheelchair thanks to the provision of a totally cleared area in front of the two side openings of the body 110 of the vehicle 100.

Hence, this robotized door 200, which is autonomous with its on-board battery 208, provides ergonomics and comfort that are unequal to date. Thus, the door 200 on the driver side when the latter approaches it opens automatically thanks to his/her transponder in his/her pocket or in his/her watch. In the same spirit, as soon as all seats are cleared, the two doors 200 will close automatically when the driver and his or her passengers leave.

The concept of a double door 200 with no overhang and with vertical clearance of the present invention enhances and optimizes the safety of the passengers in the event of a lateral impact while enabling the manufacturer to preserve the hyper-rigid shell principle thanks to its central post 120 where, for example, the anchoring points of the safety belts of the front seats are placed. The two hyper-rigid rolling tracks being secured to the central post for this double door with no overhang, this further enhances the protection of the front passengers in the event of a lateral impact. In addition, this concept preserves options: sunroof, panoramic roof, roof bar or roof rack.

Despite the complex kinematics which therefore provides for raising the door 200 above the roof 105 of the vehicle 100, said door remains compatible with the relatively low ceilings of urban parking lots. Because of the presence of a flush double window 210, the actual height of the rigid panel 201 of the opening leaf 200 is actually relatively low so that the system of the present invention is completely compatible with ceiling heights of about 2 m10 for a sedan (a little more for a SUV/Break, a little less for a sports car), i.e. the invention is suitable to most underground parking lots.

This solution also allows reducing the weight of the vehicles by using a double door which does not require a system of hinges generating extra design/manufacture costs and reinforcements for supporting the weights of the common doors (in particular those with a French fashioned opening).

Thus, the exterior design of the vehicle is not modified, and the presence of a double door could even allow for body shapes that have not been possible before. The solution could actually allow for a very clean and modern appearance at the flanks of the vehicle thanks to the uniform and continuous door panel between the front and the rear, this aspect being enhanced by the total absence of any handle.

It should be understood that the detailed description of the object of the invention, given only for illustration, does not in any way form a limitation thereof, the technical equivalents being also included within the scope of the present invention.

Thus, it should nonetheless be noted that such a mechanism for driving an opening leaf may be adapted to vehicles belonging to other technical fields, such as the aeronautical, railway or naval fields.

The entire kinematics may also be adapted to a luggage compartment door (so-called "5-door" car model), or to a hood (electric car model, whose hood encloses a storage space), insofar as the general principle of the different movements (pivoting, window/vertical movement) and above all the vertical sliding with no overhang are preserved.

The invention claimed is:

1. A motor vehicle body comprising a supporting structure extending between a front end and a rear end, the supporting structure comprising:

a floor;

a roof;

at least one side flank extending at least partly between the front end, the rear end, the floor and the roof, said at least one side flank being provided with an opening defined by an embrasure and receiving one single opening leaf articulated between at least a first closed low position in which the opening leaf conceals the opening and a second open high position in which the opening leaf is away from the opening and is positioned at least partly above the roof;

a vertical post passing vertically through the opening;

one single vertical transport carriage mounted movable in translation from top to bottom and from bottom to top along the vertical post to move the opening leaf switch from the first closed low position into the second open high position, and vice versa; and wherein the vertical transport carriage is secured to the vertical post and the opening leaf is mounted so as to be removable and dismountable on the vertical transport carriage using a pair of mechanical assembly pins cooperating with two clamping jaws for immobilization thereof.

2. The motor vehicle body of claim 1, wherein the opening leaf further comprises a convex outer profile matching said at least one side flank in the first closed low position, a distance between the convex outer profile and said at least one side flank is permanently less than ten centimeters throughout a passage of the opening leaf from the first closed low position to the second open high position, so that the opening leaf is of a vertical opening type without a side overhang.

3. The motor vehicle body of claim 2, wherein the opening leaf has a lower portion mounted on a longitudinal rotation shaft secured to the vertical transport carriage so that the opening leaf can take on an outwardly tilted intermediate position in which an upper portion of the opening leaf deviates laterally from the opening and from the said at least one side flank, before the opening leaf moves vertically from the outwardly tilted intermediate position towards the second open high position.

4. The motor vehicle body of claim 3, wherein a pivot angle of the opening leaf between the first closed low position and the outwardly tilted intermediate position is less than 20°.

5. The motor vehicle body of claim 3, wherein the longitudinal rotation shaft is connected to a first electric motor equipped with a gear motor to tilt the opening leaf.

6. The motor vehicle body of claim 5, wherein the opening leaf further comprises a movable window and a second electric motor equipped with a gear motor to lower the movable window before moving the opening leaf from the first closed low position to the second open high position, and to raise the movable window once the opening leaf is back in the first closed low position.

7. The motor vehicle body of claim 6, wherein the vertical transport carriage further comprises at least one third electric motor equipped with a gear motor to move the opening leaf along the vertical post.

8. The motor vehicle body of claim 7, wherein the vertical transport carriage further comprises two third electric motors arranged on either side of the vertical post and the two third electric motors connected to the gear motor.

9. The motor vehicle body of claim 8, wherein all of the first, second and third motors are combined in one single common motor; and wherein the vertical transport carriage comprises the one single common motor.

10. The motor vehicle body of claim 5, wherein the first tilt motor is integrated with the vertical transport carriage.

11. The motor vehicle body of claim 6, wherein the second electric motor is integrated with the opening leaf.

12. The motor vehicle body of claim 1, wherein the opening leaf is equipped with at least one hook configured to grip at an upper portion of the embrasure when the opening leaf is in the second open high position to hold the opening leaf in the second open high position.

13. The motor vehicle body of claim 12, wherein the opening leaf comprises a first hook at a low front portion and a second hook at a low rear portion, each hook engaging in a flange provided in the embrasure to immobilize the opening leaf in the second open high position, the first and second hooks fitting freely inside respective openings provided in a lower portion of the embrasure in the first closed low position of the opening leaf.

14. The motor vehicle body of claim 1, wherein the opening leaf is mounted on the vertical transport carriage so that a weight of the opening leaf is distributed identically on either side of the vertical transport carriage between the front and the rear of the opening leaf for balancing thereof.

15. The motor vehicle body of claim 1, wherein the mechanical assembly pins are secured to the vertical transport carriage and the two clamping jaws are secured to the opening leaf.

16. The motor vehicle body of claim 1, wherein the opening leaf further comprises a conical rotary drum with a return spring balancing a weight of the opening leaf for passage from the first closed low position to the second open high position, and vice versa, the return spring supporting most of the weight of the opening leaf between the first closed low position and the second open high position.

17. The motor vehicle body of claim 1, wherein the vertical transport carriage is movable along at least one rail formed on the vertical post.

18. The motor vehicle body of claim 17, wherein the vertical transport carriage is provided with four pairs of guide rollers, two first pairs of vertically superimposed rollers which slide along a first guide rail with a U-like section provided on the vertical post, and two second pairs of vertically superposed rollers sliding in a second guide rail with a U-like section removably mounted on the vertical post, opposite and parallel to said first guide rail.

19. The motor vehicle body of claim 18, wherein an axis of rotation of the two first pairs of vertically superimposed rollers extends in a longitudinal direction of the motor vehicle body, parallel to a largest dimension of the opening leaf, and an axis of rotation of the two second pairs of vertically superposed rollers extends in a transverse direction of the motor vehicle body, perpendicular to the axis of rotation of the first pairs of vertically superimposed rollers.

20. The motor vehicle body of claim 18, wherein the vertical post and each guide rail are curved.

21. The motor vehicle body of claim 1, wherein the opening leaf is free of a handle and encloses an electronic board and a transponder to remotely and automatically open and close the opening leaf without human intervention.

22. A motor vehicle comprising the motor vehicle body of claim 1.

23. A motor vehicle body, comprising a supporting structure extending between a front end and a rear end, the supporting structure comprising:
   a floor;
   a roof;
   at least one side flank extending at least partly between the front end, the rear end, the floor and the roof, said at least one side flank being provided with an opening defined by an embrasure and receiving one single opening leaf articulated between at least a first closed low position in which the opening leaf conceals the opening and a second open high position in which the opening leaf is away from the opening and is positioned at least partly above the roof;
   a vertical post passing vertically through the opening;
   one single vertical transport carriage mounted movable in translation from top to bottom and from bottom to top along the vertical post to move the opening leaf from the first closed low position into the second open high position, and vice versa; and
   wherein the opening leaf comprises a secondary battery and electrical connectors; and wherein the vertical post comprises electrical connection pads cooperating with the electrical connectors to connect the secondary battery to a main battery of the motor vehicle body only in the first closed low position of the opening leaf to recharge the secondary battery.

24. A motor vehicle body comprising a supporting structure extending between a front end and a rear end, the supporting structure comprising:
   a floor;
   a roof;
   at least one side flank extending at least partly between the front end, the rear end, the floor and the roof, said at least one side flank being provided with an opening defined by an embrasure and receiving one single opening leaf articulated between at least a first closed low position in which the opening leaf conceals the opening and a second open high position in which the opening leaf is away from the opening and is positioned at least partly above the roof;
   a vertical post passing vertically through the opening;
   one single vertical transport carriage mounted movable in translation from top to bottom and from bottom to top along the vertical post to move the opening leaf from the first closed low position into the second open high position, and vice versa; and
   wherein in the second open high position, at least 90% of the opening leaf overhangs the embrasure of the opening.

* * * * *